(12) United States Patent
Ma et al.

(10) Patent No.: US 10,638,303 B2
(45) Date of Patent: *Apr. 28, 2020

(54) SERVICE PROCESSING METHOD AND APPARATUS

(71) Applicant: Tencent Technology (Shenzhen) Company Limited, Shenzhen (CN)

(72) Inventors: Kai Ma, Shenzhen (CN); Maohua Chen, Shenzhen (CN); Mo Zhao, Shenzhen (CN); Zhenxi Qiu, Shenzhen (CN); Xiaoming Wu, Shenzhen (CN); Nan Cheng, Shenzhen (CN); Xiaohui Zheng, Shenzhen (CN); Junxiong Chen, Shenzhen (CN); Jinheng Xie, Shenzhen (CN); Zhe Cheng, Shenzhen (CN); Le Yu, Shenzhen (CN); Shuhui Mei, Shenzhen (CN); Chi Zhang, Shenzhen (CN); Huiqin Yang, Shenzhen (CN); Yao Qin, Shenzhen (CN); Shunfu Ye, Shenzhen (CN); Tao Zhang, Shenzhen (CN); Wenrong Tang, Shenzhen (CN); Yangbin Huang, Shenzhen (CN); Ming He, Shenzhen (CN); Chaoxiong Diao, Shenzhen (CN); Pengbo Zhang, Shenzhen (CN); Guanqiao Su, Shenzhen (CN); Hongmin Zheng, Shenzhen (CN); Xiaojuan Zhang, Shenzhen (CN); Zhejin Huang, Shenzhen (CN); Xiaoyang Qian, Shenzhen (CN); Zhongming Guo, Shenzhen (CN); Xiaoyi Fang, Shenzhen (CN); Yang Zuo, Shenzhen (CN); Yan Dai, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/515,914

(22) Filed: Jul. 18, 2019

(65) Prior Publication Data
US 2019/0342745 A1 Nov. 7, 2019

Related U.S. Application Data

(63) Continuation of application No. 16/056,098, filed on Aug. 6, 2018, now Pat. No. 10,412,573, which is a
(Continued)

(30) Foreign Application Priority Data

Apr. 1, 2016 (CN) .......................... 2016 1 0201505
May 12, 2016 (CN) .......................... 2016 1 0321392

(51) Int. Cl.
*H04W 24/00* (2009.01)
*H04W 8/00* (2009.01)
(Continued)

(52) U.S. Cl.
CPC .......... *H04W 8/005* (2013.01); *H04B 17/318* (2015.01); *H04W 4/00* (2013.01);
(Continued)

(58) Field of Classification Search
CPC ......... H04W 8/005; H04W 4/21; H04W 4/80; H04W 4/00; H04W 8/18; H04W 64/00; H04W 84/12; H04B 17/318; G06Q 50/01
(Continued)

(56) References Cited

U.S. PATENT DOCUMENTS

| 8,613,070 B1 | 12/2013 | Borzycki et al. |
| 9,058,738 B1 * | 6/2015 | Scalisi ................ G08B 25/10 |

(Continued)

FOREIGN PATENT DOCUMENTS

| CN | 1954326 A | 4/2007 |
| CN | 101015173 A | 8/2007 |

(Continued)

OTHER PUBLICATIONS

Tencent Technology, ISRWO, PCT/CN2017/079005, Jun. 19, 2017, 10 pgs.
(Continued)

*Primary Examiner* — Marceau Milord
(74) *Attorney, Agent, or Firm* — Morgan, Lewis & Bockius LLP

(57) ABSTRACT

Embodiments of this application provide a near-field wireless communication service processing method performed at a first computing device associated with a social networking
(Continued)

```
┌─────────────────────────────────────────────────────┐
│ Receive a uniform resource locator of a preset     │ ─ S701
│ service page sent by a server                       │
└─────────────────────────────────────────────────────┘
                          │
                          ▼
┌─────────────────────────────────────────────────────┐
│ Obtain service information corresponding to the     │ ─ S702
│ preset service page according to the uniform        │
│ resource locator of the preset service page         │
└─────────────────────────────────────────────────────┘
``` application. While running a social networking application, the first computing device detects a near-field wireless communication signal broadcasted by a second computing device associated with a service provider account registered with the social networking application. After determining that a distance between the first computing device and the second computing device is less than a preset threshold, the first computing device extracts, from the near-field wireless communication signal, identification information of the second computing device, sends the identification information of the second computing device to a remote server and obtains a preset service page corresponding to the identification information of the second computing device from the server, and displays the preset service page within the social networking application on the first computing device.

20 Claims, 13 Drawing Sheets

Related U.S. Application Data continuation-in-part of application No. PCT/CN2017/079005, filed on Mar. 31, 2017.

(51) Int. Cl.
| | |
|---|---|
| *H04W 4/00* | (2018.01) |
| *H04B 17/318* | (2015.01) |
| *H04W 4/029* | (2018.01) |
| *H04W 4/21* | (2018.01) |
| *H04W 4/80* | (2018.01) |
| *H04W 64/00* | (2009.01) |
| *H04W 4/12* | (2009.01) |
| *G06Q 50/00* | (2012.01) |
| *H04W 8/18* | (2009.01) |
| *H04W 84/12* | (2009.01) |

(52) U.S. Cl.
CPC ........... *H04W 4/029* (2018.02); *H04W 4/21* (2018.02); *H04W 4/80* (2018.02); *H04W 64/00* (2013.01); *G06Q 50/01* (2013.01); *H04W 4/12* (2013.01); *H04W 8/18* (2013.01); *H04W 84/12* (2013.01)

(58) Field of Classification Search
USPC .............................................. 455/456.3, 41.2
See application file for complete search history.

(56) References Cited

U.S. PATENT DOCUMENTS

| | | | |
|---|---|---|---|
| 9,094,584 B2 * | 7/2015 | Scalisi ................ | H04M 1/0291 |
| 9,237,318 B2 * | 1/2016 | Kasmir ................... | H04N 5/33 |
| 9,247,219 B2 * | 1/2016 | Kasmir ............ | G08B 13/19684 |
| 9,253,455 B1 * | 2/2016 | Harrison ............. | H04M 1/0291 |
| 10,039,145 B2 | 7/2018 | Alipour et al. | |
| 10,412,573 B2 * | 9/2019 | Ma .......................... | H04W 4/80 |
| 2002/0116268 A1 | 8/2002 | Fukuda | |
| 2011/0314153 A1 | 12/2011 | Bathiche et al. | |
| 2013/0102287 A1 | 4/2013 | Toksvig et al. | |
| 2014/0082046 A1 | 3/2014 | Tal et al. | |
| 2014/0127992 A1 * | 5/2014 | Kuscher ............... | H04B 5/0031 |
| | | | 455/41.1 |
| 2014/0330933 A1 | 11/2014 | Papakipos et al. | |
| 2015/0081860 A1 | 3/2015 | Kuehnel et al. | |
| 2015/0188949 A1 | 7/2015 | Mahaffey et al. | |
| 2015/0350362 A1 | 12/2015 | Pollack et al. | |
| 2015/0350766 A1 | 12/2015 | Schobel et al. | |
| 2015/0356563 A1 | 12/2015 | Vohra et al. | |
| 2016/0027399 A1 | 1/2016 | Wilde et al. | |
| 2016/0062623 A1 | 3/2016 | Howard et al. | |
| 2016/0105129 A1 * | 4/2016 | Herriot ............... | H02M 7/4807 |
| | | | 363/132 |
| 2016/0180316 A1 | 6/2016 | Wang et al. | |
| 2016/0316314 A1 | 10/2016 | Swaminathan et al. | |
| 2016/0321649 A1 * | 11/2016 | Dragushan ........... | G06Q 20/342 |
| 2016/0321666 A1 * | 11/2016 | Dragushan ......... | G06K 9/00536 |
| 2017/0064490 A1 | 3/2017 | Jin et al. | |
| 2017/0078454 A1 | 3/2017 | Berookhim et al. | |
| 2017/0150533 A1 | 5/2017 | Alipour et al. | |
| 2017/0178117 A1 * | 6/2017 | McClard ............. | G06Q 20/3224 |
| 2017/0302659 A1 * | 10/2017 | Shteingart .......... | H04L 63/0853 |
| 2018/0268476 A1 | 9/2018 | Brown | |
| 2018/0368193 A1 | 12/2018 | Alipour et al. | |
| 2019/0034921 A1 * | 1/2019 | Hammad ............... | G06Q 30/06 |
| 2019/0065039 A1 | 2/2019 | Howard et al. | |

FOREIGN PATENT DOCUMENTS

| | | |
|---|---|---|
| CN | 101137082 A | 3/2008 |
| CN | 103914718 A | 7/2014 |
| CN | 104219617 A | 12/2014 |
| CN | 104243691 A | 12/2014 |
| CN | 104978655 A | 10/2015 |
| CN | 105933846 A | 9/2016 |
| CN | 106028262 A | 10/2016 |
| EP | 2667519 A1 | 11/2013 |
| JP | 2004235713 A | 8/2004 |
| KR | 20140146080 A | 12/2014 |

OTHER PUBLICATIONS

Tencent Technology, IPRP, PCT/CN2017/079005, Oct. 2, 2018, 7 pgs.

* cited by examiner

SERVICE PROCESSING METHOD AND APPARATUS

PRIORITY CLAIM AND RELATED APPLICATIONS

This application is a continuation application of U.S. application Ser. No. 16/056,098, entitled "SERVICE PROCESSING METHOD AND APPARATUS" filed on Aug. 6, 2018, which is a continuation-in-part application of PCT/CN2017/079005, entitled "SERVICE PROCESSING METHOD AND APPARATUS" filed on Mar. 31, 2017, which claims priority to (i) Chinese Patent Application No. 201610201505.3, filed with the Chinese Patent Office on Apr. 1, 2016 and entitled "SERVICE PROCESSING METHOD, APPARATUS, TERMINAL AND SERVICE SYSTEM", and (ii) Chinese Patent Application No. 201610321392.0, filed with the Chinese Patent Office on May 12, 2016 and entitled "METHOD AND APPARATUS FOR OBTAINING NEAR-FIELD SERVICE OF APPLICATION", all of which are incorporated herein by reference in their entirety.

FIELD OF THE TECHNOLOGY

This application relates to the field of Internet technologies, and in particular, to a service processing method and apparatus.

BACKGROUND OF THE DISCLOSURE

With the development of Internet technologies, mobile terminals are widely applied in various cases, such as interaction, social networking, shopping, and payment. Accordingly, people have developed various software applications (APPs) applicable to mobile terminals, bringing great convenience to people's life.

SUMMARY

Embodiments of this application provide a service processing method, apparatus, terminal, and service system, so as to simplify a service providing process (e.g., via a service page or a mobile software application that operate on a user's mobile device) between a service provider and a user using the mobile device. The method disclosed herein does not require scanning a machine-readable code using the mobile device, or having a close or direct contact between the mobile device and a target object to activate the service. The method disclosed herein also can be applied to a wide range of computing devices, without limitations to the operation system and/or hardware. By using a contact-less near-field wireless communication method, the method can improve efficiency and success rate of obtaining service provided by a service provider (e.g., rendering and interacting with a service page), and improve service processing efficiency.

An embodiment of this application provides a near-field wireless communication service processing method. The method is performed by a first computing device having one or more processors and memory storing a plurality of programs to be executed by the one or more processors. The method comprises: detecting a near-field wireless communication signal broadcasted by a second computing device; estimating a distance between the first computing device and the second computing device based on a signal strength value and a reference value of the near-field wireless communication signal; when the distance between the first computing device and the second computing device is less than a preset threshold, extracting, from the near-field wireless communication signal, identification information of the second computing device, sending the identification information of the second computing device to a server; and obtaining a preset service page corresponding to the identification information of the second computing device from the server, and displaying the preset service page on the first computing device.

An embodiment of this application further provides a first computing device having one or more processors, and memory storing a plurality of programs, when executed by the one or more processors, cause the computing device to perform the aforementioned near-field wireless communication service processing method.

An embodiment of this application further provides a non-transitory computer readable storage medium storing a plurality of programs in connection with a first computing device. The computing device has one or more processors, and the plurality of programs, when executed by the one or more processors, cause the computing device to perform the aforementioned near-field wireless communication service processing method.

BRIEF DESCRIPTION OF THE DRAWINGS

To describe the embodiments of this application more clearly, the following briefly describes the accompanying drawings required for describing the embodiments. The accompanying drawings in the following description show only some embodiments of this application, and other drawings can be derived from these accompanying drawings.

DESCRIPTION OF EMBODIMENTS

The technical solutions in the embodiments of this application will be described clearly and completely with reference to the accompanying drawings in the embodiments of this application. Obviously, the described embodiments are only some embodiments rather than all embodiments of this application. All other embodiments obtained by a person of ordinary skill in the art based on the embodiments of this application without any creative efforts fall within the protection scope of this application.

It should be noted that the terms such as "first" and "second" in the specification, claims, and accompanying drawings of this application are used to differentiate similar objects, and do not necessarily describe any particular sequence or order. It should be understood that, data used in such a manner can be interchanged in proper cases, so that the embodiments of this application described herein can be implemented in sequences different from those depicted or described herein. Moreover, the terms "include", "comprise", and any variation thereof are intended to cover a non-exclusive inclusion. For example, a process, method, system, product or device that includes a series of steps or units are not necessarily limited to the steps or units expressly listed, but can include steps or units that are not specified expressly, or include inherent steps or units of the process, method, product or device.

Figure 1:
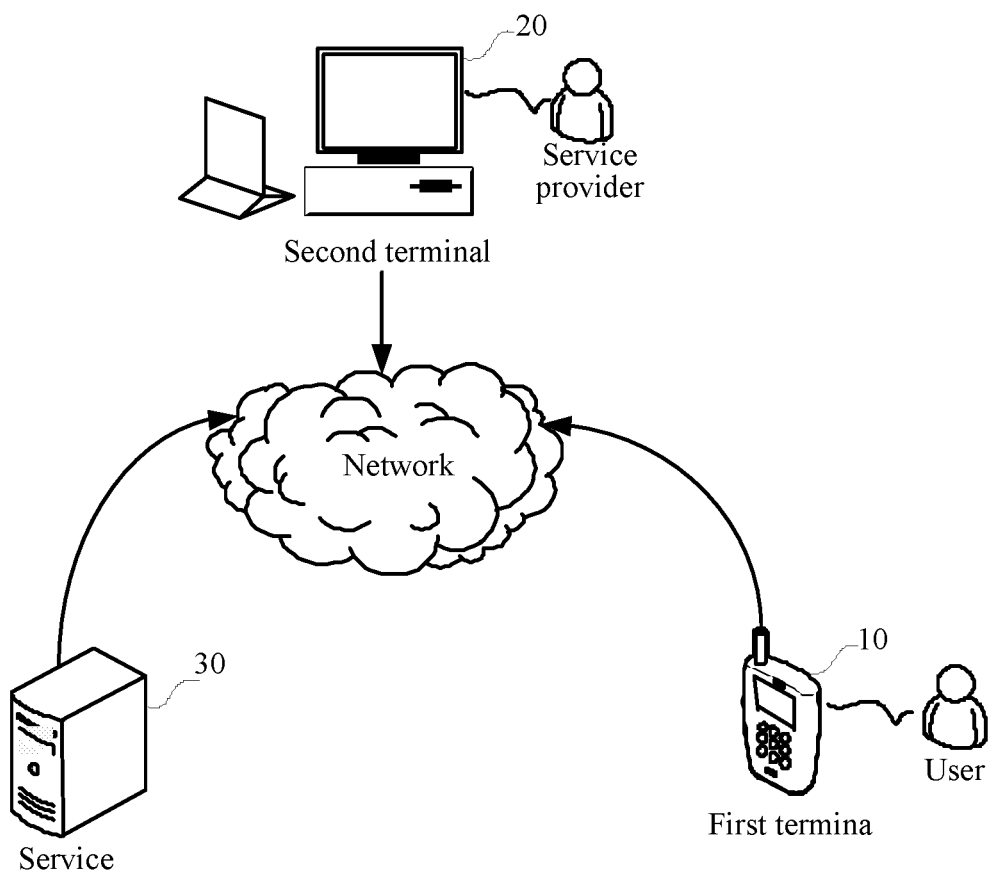
FIG. 1 is a schematic structural diagram of a service system according to an embodiment of this application.

An embodiment of this application discloses a service system. FIG. 1 is a schematic structural diagram of a service system according to an embodiment of this application. Referring to FIG. 1, the system may include: a first terminal (also referred to as "a first computing device, a first mobile device, a first device, a first end device") 10, a second terminal 20 (also referred to as "a second computing device, a second mobile device, a second device, a second end device"), and a server 30.

The first terminal 10 may be a portable terminal device such as a mobile phone, a PAD, or a smart wearable device. A software application (APP) may be installed and run on the first terminal 10. The APP may include, but is not limited to: a Social Networking Service (SNS) APP (e.g., WeChat APP), an instant messaging APP, and the like. The second terminal 20 refers to a device provided by a service provider and capable of providing various services for users on an Internet terminal side. The second terminal 20 may be a computer, a Decca, a mobile device, or the like. The services herein may include, but are not limited to: a shopping service, such as coupon reception, an attach-based shopping mall guide service, shopping payment, and a cashier payment service; an administrative management service, such as attendance checking and sign-in; an interaction communication service, such as obtaining a conference agenda, obtaining speech materials, communication interaction, and obtaining attendee information; a restaurant meal ordering service, such as providing meal ordering service information for users. The server 30 may be an independent service device, or a service device cluster consisting of multiple independent service devices, or a social networking server that supports social networking applications operating on one or more computing devices, such as the first terminal 10 and/or the second terminal 20.

In this embodiment of this application, the second terminal 20 is, for example, a service device that can broadcast or emit near-field wireless communication signals, and includes, but is not limited to, a Bluetooth Low Energy (BLE) device or a Near Field Communication (NFC) device. Moreover, the first terminal 10 has a near-field wireless communication function. The first terminal 10 and the second terminal 20 can implement near-field wireless communication. A service process of the service system shown in FIG. 1 is specifically as follows:

First, the service provider may register a service with the server 30. In specific implementation, the service provider may use a device such as a personal computer (PC) or a mobile phone to send a registration request to the server 30, where the registration request may include a service page that requests registration. The server 30 allocates a piece of unique identification information to the service provider according to the registration request of the service provider, and stores the identification information and the service page included in the registration request thereof in an associated manner. The identification information is, for example, a service identifier. It should be noted that, after the identification information and the service page are stored in an associated manner, the associated service page can be obtained from the server according to the identification information after a terminal submits a service request including the identification information to the server.

Secondly, the service provider configures, in its own second terminal 20, the identification information allocated by the server 30, and may put the second terminal 20 in some offline scenarios related to the service provided by the service provider, for example, in a restaurant, a shopping mall, or a metro station. The second terminal 20 may broadcast and emit near-field wireless communication signals at particular frequency (for example, every one minute, or every five minutes), and add the identification information configured by the service provider to the near-field wireless communication signal. In actual application, in order to provide the service for users more conveniently, the service provider may make, on the second terminal 20, an operation prompt for obtaining the service. For example, the service provider may make an operation prompt such as "attach" or "tap" on the second terminal 20, to remind a user to perform the prompted operation to obtain the service page. It can be understood that, the service provider may make a brief introduction about the provided service in the second terminal 20. For example, the following information is provided as a remark in the second terminal 20: shopping payment can be carried out by means of "attach".

Further, a user on a terminal side may enable the near-field wireless communication function of the first terminal 10, and perform the prompted operation on the first terminal 10 according to the operation prompt in the second terminal 20. In this case, near-field contact can be implemented between the first terminal 10 and the second terminal 20. Then, the first terminal 10 can obtain the near-field wireless communication signal broadcasted by the second terminal 20, and process the identification information of the second terminal 20 from the signal, thereby obtaining the corresponding service page from the server 30 according to the identification information and outputting the service page to the user, so that the user browses the service page or carries out a subsequent operation. So far, the service process is ended. According to the foregoing service process, the user simply needs to perform, by using the first terminal 10, the action prompted by the second terminal 20, and thus can rapidly obtain the service page provided by the service provider. The operation is simple and convenient, and the service processing is highly efficient.

It should be noted that, in this embodiment of this application, the server 30 may be a backend server of an Internet APP (such as an SNS APP or an instant messaging APP), or may not be a backend server of an Internet APP. When the server 30 is a backend server of an Internet APP, in the foregoing service process, if the Internet APP in the first terminal 10 is in a running state (that is, the user has already started the Internet APP in the first terminal 10) after the near-field wireless communication function of the first terminal 10 is enabled, the first terminal 10 immediately obtains the near-field wireless communication signal broadcast by the second terminal 20. If the Internet APP in the first terminal 10 is not in a running state (that is, the user has not started the Internet APP in the first terminal 10), the first terminal 10 may not obtain the near-field wireless communication signal broadcast by the second terminal 20, until the Internet APP is started. As such, power consumption of the first terminal 10 can be reduced, and performance of the first terminal 10 can be improved.

In the service system in this embodiment of this application, the second terminal 20 broadcasts a near-field wireless communication signal carrying identification information to the first terminal 10. The first terminal 10 processes the near-field wireless communication signal to obtain the identification information of the second terminal 20. According to the identification information, the first terminal 10 can directly obtain a corresponding service page from the server 30 and output the service page. In the whole obtaining process, the user only needs to enable the first terminal 10 to have near-field contact with the second terminal 20. The operation is simple. Moreover, the first terminal 10 can obtain the identification information simply by processing the near-field wireless communication signal according to a near-field wireless communication protocol, and can further obtain the service page, thus improving efficiency and a success rate of obtaining a service page, and improving service processing efficiency.

Based on the description above, an embodiment of this application provides a service processing method.

In some embodiments, the first computing device 10 listens to a near-field wireless communication signal broadcasted by the second computing device 20. In some embodiments, a user is using a social networking application running on the first computing device when the first computing device listens to wireless communication signals broadcasted by one or more devices, including a near-field wireless communication signal by the second computing device.

In some embodiments, the first computing device 10 detects the near-field wireless communication signal broadcasted by the second computing device 20, and processes the near-field wireless communication signal to obtain identification information associated with the second computing device 20. In some embodiments, the identification information is uniquely associated with a service provided by a service provider associated with the second computing device 20. In some embodiments, the service provider pre-registers the service with a social networking server that supports the social networking application. In some embodiments, service provider uses the social networking application operating on the second computing device to register his or her services. For example, a user interface of the social networking application displays a registration form that prompts the service provider to provide information related to the service using the second computing device to register. For example, a restaurant owner can use a mobile device (e.g., the second computing device) to register a menu ordering service using the social networking application (e.g., WeChat) with the social networking server. The service provider may provide a plurality of dishes and corresponding prices of the dishes. In some embodiments, the social networking server sends a unique ID to the second computing device. In some embodiments, the unique ID is associated with the menu ordering service provided by the restaurant. In some embodiments, the unique ID is also associated with the second computing device. The restaurant owner (the service provider) then associates the ID with a near-filed wireless communication ID (e.g., IBeacon, Bluetooth, NFC, etc.) provided by the second computing device (now that the ID is associated with the second computing device, the near-field wireless communication ID, and the service (e.g., a menu ordering page)), such that another computing device (e.g., the first computing device) in communication with the second computing device using the near-filed wireless communication can obtain the ID, and use the service via the social networking application on the first computing device. In some embodiments, after the registration process, the second computing device may be in off-line status (e.g., not connected to the Internet) while operating the near-field communication. In some embodiments, the near-field wireless communication signal detected by the first computing device may further include data packets corresponding to instructions to display a notification message (or a commercial) in a user interface on the first computing device. The notification message notifies the user of the first computing device about the available service, e.g., the user can touch a button on the user interface to view and interact with the service page displayed on the first computing device.

In some embodiments, the first computing device sends the identification information associated with the second computing device to a server. In some embodiments, the first computing device than obtains a preset service page (e.g., the menu ordering page) corresponding to the identification information associated with the second computing device from the server, and displays the preset service page (e.g., the menu ordering page) on the first computing device. In some embodiments, the preset service page is displayed within the social networking application via an in-app browser.

Figure 2:
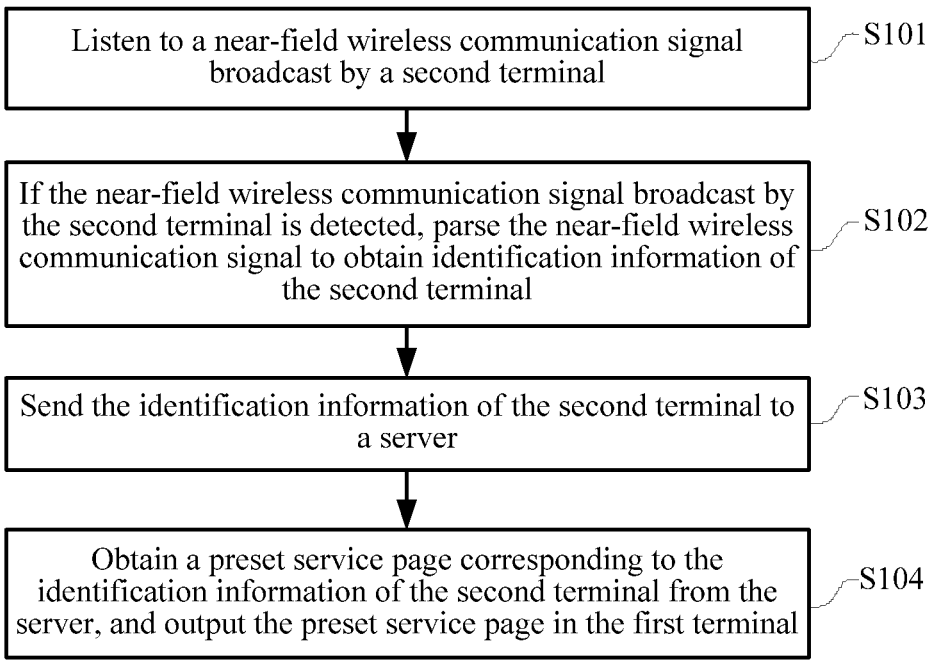
FIG. 2 is a flowchart of a service processing method according to an embodiment of this application.

FIG. 2 is a flowchart of a service processing method according to an embodiment of this application. The service processing method is performed by the first terminal 10 shown in FIG. 1, and is specifically performed by a service processing apparatus in the first terminal 10. The service processing apparatus may be an APP in the first terminal 10. The APP may be an SNS APP, an instant messaging APP, or the like. Referring to FIG. 1, the service processing method may include the following steps S101 to S104.

S101: Listen to a near-field wireless communication signal broadcast by a second terminal.

In this step, an APP in the first terminal invokes the first terminal to listen to a near-field wireless communication signal broadcast by a second terminal.

In specific implementations, before step S101 is performed, the following steps s11 to s12 may further be performed:

s11: Enable a near-field wireless communication function of the first terminal, the near-field wireless communication function including a Bluetooth communication function or an NFC function.

s12: Detect whether the first terminal performs a movement operation along a direction approaching the second terminal; and if a detection result is yes, trigger and perform step S101.

In actual application, the second terminal is usually put in some offline scenarios related to a service provided by the second terminal, for example, in a restaurant, a shopping mall, and a metro station. Moreover, in order to provide the service for users more conveniently, a service provider may make, on the second terminal, an operation prompt for obtaining the service. For example, the service provider may make an operation prompt such as "attach" or "tap" on the second terminal, or the following information is provided as a remark in the second terminal: shopping payment can be carried out by means of "attach". In steps s11 to s12, before obtaining the service provided by the second terminal, the user on the terminal side needs to enable the Bluetooth communication function or the NFC function of the first terminal, and perform an operation on the first terminal according to the operation prompt in the second terminal. When it is detected that the first terminal is operated by the user to move along a direction approaching the second terminal, and near-field contact such as "attach" or "tap" is implemented between the first terminal and the second terminal, the subsequent step S101 can be triggered, so as to listen to a near-field wireless communication signal broadcast by the second terminal. The near-field wireless communication signal may include, but is not limited to: a BLE signal or an NFC signal. The BLE signal is a low-cost, short-distance, interoperable robust wireless signal, and a distance between both parties in communication to meet a particular requirement, so as to implement super-low energy consumption. The NFC signal is a short-distance high-frequency wireless signal.

S102: If the near-field wireless communication signal broadcast by the second terminal is detected, process the near-field wireless communication signal to obtain identification information of the second terminal.

If an NFC signal broadcast by the second terminal is detected, the APP can process the NFC signal according to an NFC protocol format, to obtain identification information of the second terminal. The identification information is, for example, a service identifier. Then, steps S103 to S104 are performed. The BLE technology has a particular requirement on a distance between both parties in communication, so as to implement super-low energy consumption. Therefore, if a BLE signal broadcast by the second terminal is detected, after the step of processing the BLE signal according to a BLE protocol format to obtain identification information of the second terminal, and before steps S103 to S104, the following step s13 can further be performed:

s13: Determine, according to the BLE signal, whether the second terminal meets a service condition.

In some embodiments, the first computing device determines whether the second computing device meets a service condition. In some embodiments, the first computing device determines whether the communication between the first and second computing devices satisfy the service condition. In some embodiments, the first computing device can determine via the strength of the near-field wireless communication signal received from the second computing device, or information in data packets carried in the near-field wireless communication signal. For example, the checking the service condition includes determining whether the first computing device is within a predetermine distance (e.g., 10 meters, 5 meters, or 1 meter, etc.) from the second computing device. In another example, checking the service condition includes determining whether a battery of the first computing device is above a predetermined threshold so that the first computing device can perform the service provided by the service provider. In some embodiments, the predetermined threshold may be different depending on the type of service, e.g., 20% for menu ordering at a restaurant, 50% for watching a video commercial in a department store, 70% for watching a collection of movie trailers near a move theater, 85% for playing a video game in a shopping center, etc. In some embodiments, checking the service condition includes determining whether a strength of the signal received at the first computing device via the near-filed communication provided by the second computing device is above a predetermined threshold, such that a consistent and uninterrupted service can be guaranteed.

If the second terminal meets the service condition, it indicates that a distance between the first terminal and the second terminal meets the requirement, and the first terminal can receive the service provided by the second terminal. Otherwise, it indicates that the distance between the first terminal and the second terminal cannot meet the requirement, high energy consumption may be generated, and therefore the first terminal cannot receive the service provided by the second terminal. In specific implementation, when step s13 in the method is performed, the following steps ss131 to ss134 are specifically performed:

ss131: Obtain a strength value and a reference value of the BLE signal from the second terminal.

ss132: Calculate a distance between the first terminal and the second terminal according to the strength value and the reference value of the BLE signal In steps ss131 to ss132, while broadcasting the BLE signal, the second terminal usually broadcasts a strength value of the BLE signal, and the strength value may be denoted as Received Signal Strength Indicator (RSSI). In addition, the second terminal determines a strength value of the BLE signal, which corresponds to a particular distance between first terminal and the second terminal, as a reference value, and provides the reference value to the first terminal. It should be noted herein that, the particular distance may be set empirically. For example, the particular distance may be 1 m. Because the reference value is used for describing the strength of the BLE signal corresponding to a particular distance between the first terminal and the second terminal, an actual distance between the first terminal and the second terminal can be calculated by comparing the obtained strength value of the BLE signal with the reference value.

ss133: Determine whether the distance is less than a preset threshold.

ss134: If the distance is less than the preset threshold, confirm that the second terminal meets the service condition.

In steps ss133 to ss134, if the distance is less than a preset threshold, it indicates that the distance between the first terminal and the second terminal meets the requirement, and the second terminal meets the service condition and is able to provide the service for the first terminal. Otherwise, it indicates that the distance between the first terminal and the second terminal cannot meet the requirement, high energy consumption may be generated, and therefore the first terminal cannot receive the service provided by the second terminal.

After steps ss131 to ss134, if the second terminal meets the service condition, steps S103 to S104 are continued to be performed.

S103: Send the identification information of the second terminal to a server.

S104: Obtain a preset service page corresponding to the identification information of the second terminal from the server, and output the preset service page in the first terminal.

In steps S103 to S104, because the server stores the identification information of the second terminal and the preset service page in an associated manner, the server can find the associated preset service page in storage space of the second terminal according to the identification information of the second terminal. Further, the first terminal obtains the preset service page from the server, and outputs the preset service page in the first terminal, so that the user browses the preset service page or carries out a subsequent operation.

The process of the service processing method according to this embodiment of this application is described in detail below with an instance. In this instance, a scenario of attach-based shopping in a retail store is taken as an example. Details are described as follows:

A retail store owner registers a service in a server by using an instant messaging APP in a mobile phone or computer, to obtain a service identifier, and sets a preset service page corresponding to the service identifier. The preset service page includes information such as names, brief descriptions, and prices of goods sold in the retail store. The retail store owner configures the service identifier in a second terminal (which specifically may be a BLE device), puts the second terminal in the retail store, and makes, on the second terminal, an operation prompt for attach-based payment.

When wanting to shop in the retail store, a user may enable a Bluetooth communication function of a mobile phone, open an instant messaging APP in the mobile phone, and move the mobile phone close to the second terminal. The second terminal broadcasts a BLE signal to the mobile phone. The mobile phone processes the BLE signal to obtain the service identifier of the second terminal, and pulls the preset service page corresponding to the service identifier from the server. The mobile phone outputs the pulled preset service page. The user can select goods to be purchased on the preset service page, and initiate subsequent processes such as order confirmation and payment to complete shopping.

In the service processing method in this embodiment of this application, the second terminal broadcasts a near-field wireless communication signal carrying identification information to the first terminal. The first terminal processes the near-field wireless communication signal to obtain the identification information of the second terminal. According to the identification information, the first terminal can directly obtain a corresponding preset service page from the server and output the preset service page. In the whole obtaining process, the user only needs to enable the first terminal to have near-field contact with the second terminal. The operation is simple. Moreover, the first terminal can obtain the identification information simply by processing the near-field wireless communication signal according to a near-field wireless communication protocol, and can further obtain the preset service page, thus improving efficiency and a success rate of obtaining a preset service page, and improving service processing efficiency.

Based on the service processing system and service processing method shown in the foregoing embodiments, an embodiment of this application further provides a terminal.

The terminal may be the first terminal in the system shown in FIG. 1, and the terminal can perform corresponding steps in the process of the method shown in FIG. 2.

Figure 3:
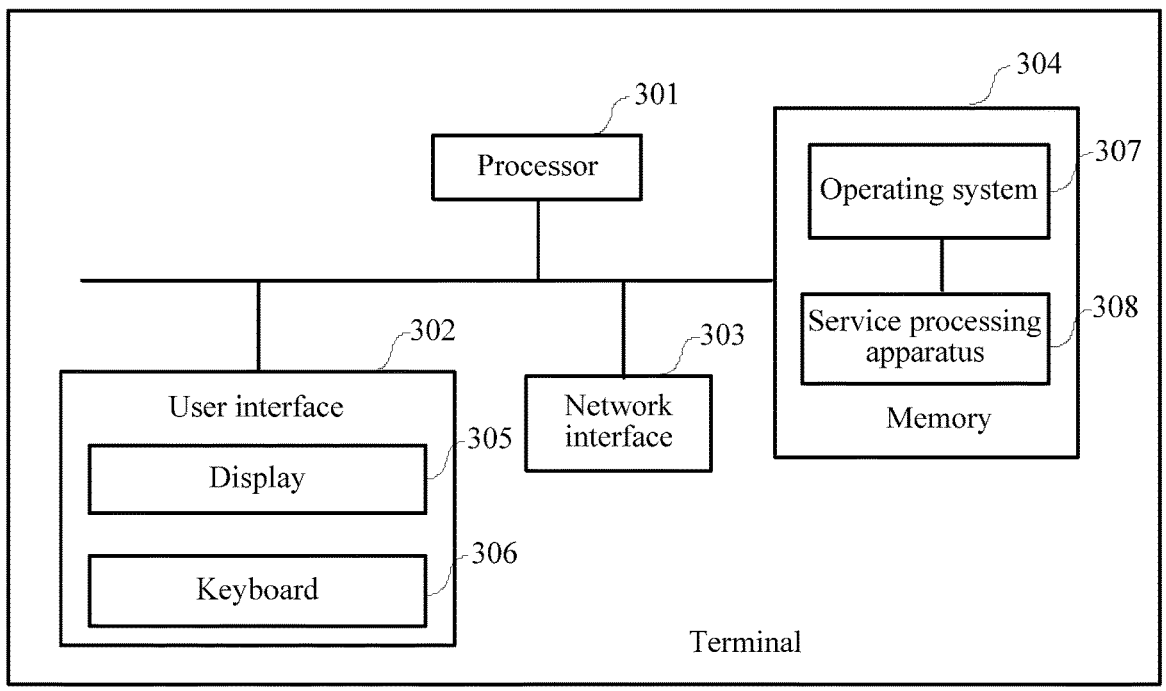
FIG. 3 is a schematic structural diagram of a terminal according to an embodiment of this application.

FIG. 3 is a schematic structural diagram of a terminal according to an embodiment of this application. Referring to FIG. 3, an internal structure of the terminal may include, but is not limited to: a processor 301, a user interface 302, a network interface 303, and a memory 304. The processor 301, the user interface 302, the network interface 303 and the memory 304 in the terminal may be connected by means of a bus or in other manners. Connection by means of a bus is used as an example in FIG. 3 in this embodiment of this application.

The user interface 302 is a medium for implementing interaction and information exchange between a user and the terminal, and can be specifically embodied as a display 305 for output, a keyboard 306 for input, and the like. It should be noted that, the keyboard 306 herein may be a physical keyboard, a touchscreen virtual keyboard, or a combination of a physical keyboard and a touchscreen virtual keyboard. The processor (also known as a Central Processing Unit (CPU)) 301 is a computation core and a control core of the terminal, and can process various instructions in the terminal and process various data in the terminal. The memory 304 is a memory device in the terminal, and is configured to store programs and data. It can be understood that, the memory 304 herein may include a built-in memory of the terminal, and definitely may also include an extended memory supported by the terminal. The memory 304 provides storage space that stores an operating system 307 of the terminal. The operating system 307 may include, but is not limited to: the Windows system (which is an operating system), the Android system (which is a mobile operating system), the IOS system (which is a mobile operating system), and the like, which are not limited in this application. The storage space of the memory 304 stores a service processing apparatus 308. The service processing apparatus 308 may be an Internet APP running in the terminal, and may include, but is not limited to: an SNS APP, an instant messaging APP, and the like.

Figure 4:
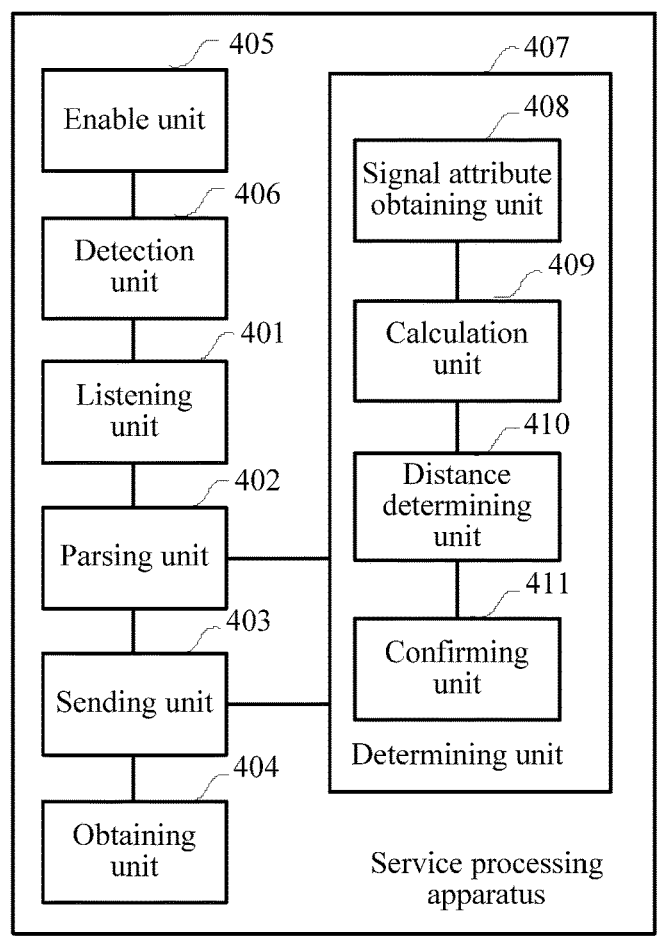
FIG. 4 is a schematic structural diagram of a service processing apparatus according to an embodiment of this application.

In this embodiment of this application, the terminal may run the service processing apparatus 308 in the memory 304 to perform corresponding steps in the process of the method shown in FIG. 2. FIG. 4 is a schematic structural diagram of a service processing apparatus according to an embodiment of this application. Referring to FIG. 4 together, the apparatus runs the following units: a listening unit 401, configured to listen to a near-field wireless communication signal broadcast by a second terminal, where the near-field wireless communication signal includes a BLE signal or an NFC signal; a processing unit 402, configured to: if the near-field wireless communication signal broadcast by the second terminal is detected, process the near-field wireless communication signal to obtain identification information of the second terminal; a sending unit 403, configured to send the identification information of the second terminal to a server; and an obtaining unit 404, configured to obtain a preset service page corresponding to the identification information of the second terminal from the server, and output the preset service page in the first terminal.

In specific implementation, the apparatus may further run the following units: an enable unit 405, configured to enable a near-field wireless communication function of the first terminal, the near-field wireless communication function including a Bluetooth communication function or an NFC function; and a detection unit 406, configured to: detect whether the first terminal performs a movement operation along a direction approaching the second terminal; and if a detection result is yes, trigger the listening unit 401 to listen to the near-field wireless communication signal broadcast by the second terminal.

In specific implementation, if the near-field wireless communication signal broadcast by the second terminal is a BLE signal, the apparatus further runs the following unit: a determining unit 407, configured to determine, according to the BLE signal, whether the second terminal meets a service condition, where if the second terminal meets the service condition, the obtaining unit 404 obtains the preset service page corresponding to the identification information of the second terminal from the server.

In specific implementation, in the process of running the determining unit 407, the apparatus specifically runs the following units: a signal attribute obtaining unit 408, configured to obtain a strength value and a reference value of the BLE signal from the second terminal; a calculation unit 409, configured to calculate a distance between the first terminal and the second terminal according to the strength value and the reference value of the BLE signal; a distance determining unit 410, configured to determine whether the distance is less than a preset threshold; and a confirmation unit 411, configured to: if the distance is less than the preset threshold, confirm that the second terminal meets the service condition.

In the terminal and the service processing apparatus in the embodiments of this application, the second terminal broadcasts a near-field wireless communication signal carrying identification information to the first terminal. The first terminal processes the near-field wireless communication signal to obtain the identification information of the second terminal. According to the identification information, the first terminal can directly obtain a corresponding preset service page from the server and output the preset service page. In the whole obtaining process, the user only needs to enable the first terminal to have near-field contact with the second terminal. The operation is simple. Moreover, the first terminal can obtain the identification information simply by processing the near-field wireless communication signal according to a near-field wireless communication protocol, and can further obtain the preset service page, thus improving efficiency and a success rate of obtaining a preset service page, and improving service processing efficiency.

Figure 5:
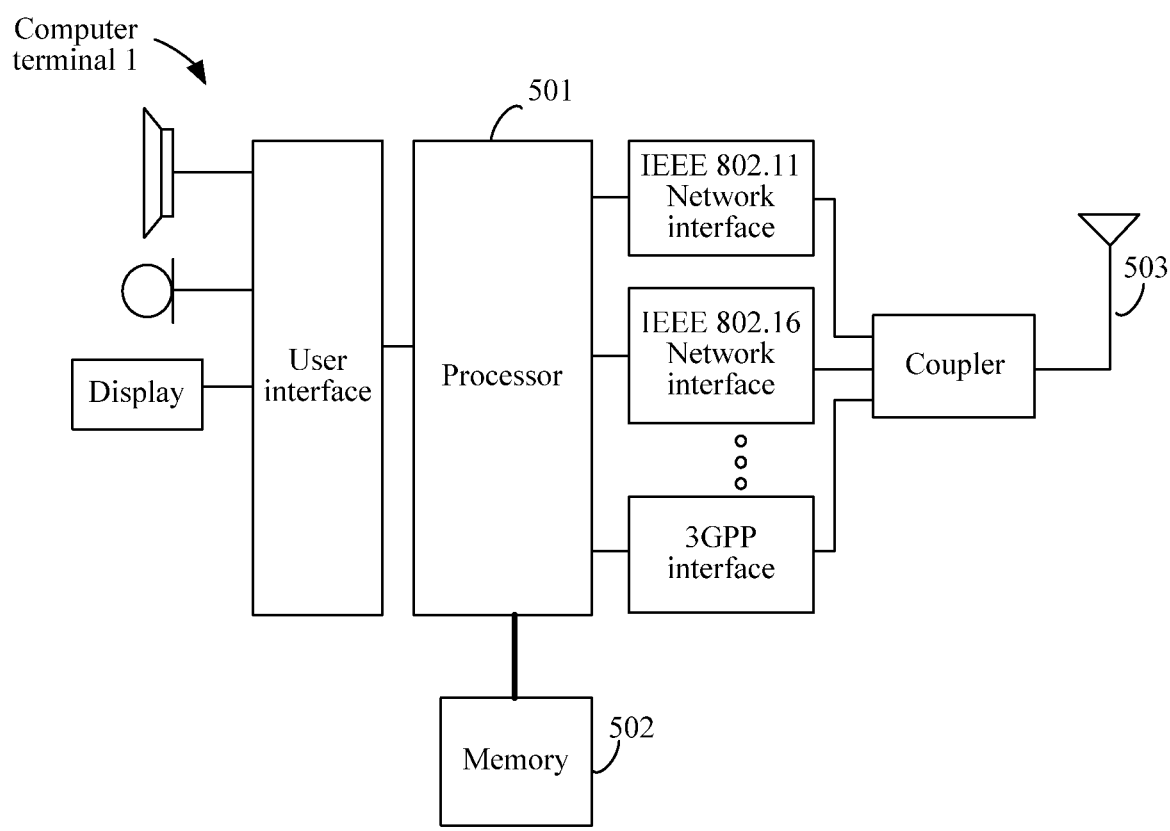
FIG. 5 is a structural block diagram of hardware of a computer terminal for a service processing method according to an embodiment of this application.

The method embodiment provided in Embodiment 1 of this application can be performed in a mobile terminal, a computer terminal, or a similar arithmetic apparatus. Using running on a computer terminal as an example, FIG. 5 is a structural block diagram of hardware of a computer terminal for a service processing method according to an embodiment of the present disclosure. As shown in FIG. 5, the computer terminal 1 may include one or more (only one is shown in the figure) processors 501 (where the processor 501 may include, but is not limited to, a microprocessor MCU, a programmable logic device FPGA, or other processing apparatuses), a memory 502 configured to store data, and a transmission apparatus 503 configured for a communication function. A person of ordinary skill in the art can understand that, the structure shown in FIG. 5 is only an example, and does not limit the structure of the foregoing electronic apparatus. For example, the computer terminal 1 may further include more or fewer components than those shown in FIG. 5, or have a configuration different from that in FIG. 5.

The memory 502 may be configured to store a software program and module of application software, such as a program instruction/module corresponding to a method for obtaining a near-field service of an APP in the embodiment of the present disclosure. The processor 501 runs the software program and module stored in the memory 502 to execute various functional applications and data processing, that is, implement the foregoing method for obtaining a near-field service of an APP. The memory 502 may include a high-speed random access memory (RAM), and may further include a non-volatile memory, such as one or more magnetic storage apparatuses, a flash memory, or other non-volatile solid-state memories. In some examples, the memory 502 may further include memories disposed remotely with respect to the processor 501. The remote memories may be connected to the computer terminal 1 via a network. Examples of the network include, but are not limited to: the Internet, an intranet, a local area network, a mobile communications network, and a combination thereof.

The transmission apparatus 503 is configured to receive or send data by using a network. A specific example of the network may include a wireless network provided by a communication provider of the computer terminal 1. In an example, the transmission apparatus 503 includes a network interface controller (NIC), which can be connected to another network device via a base station, and therefore can communicate with the Internet. In an example, the transmission apparatus 503 may be a radio frequency (RF) module, which is configured to communicate with the Internet in a wireless manner.

Figure 6:
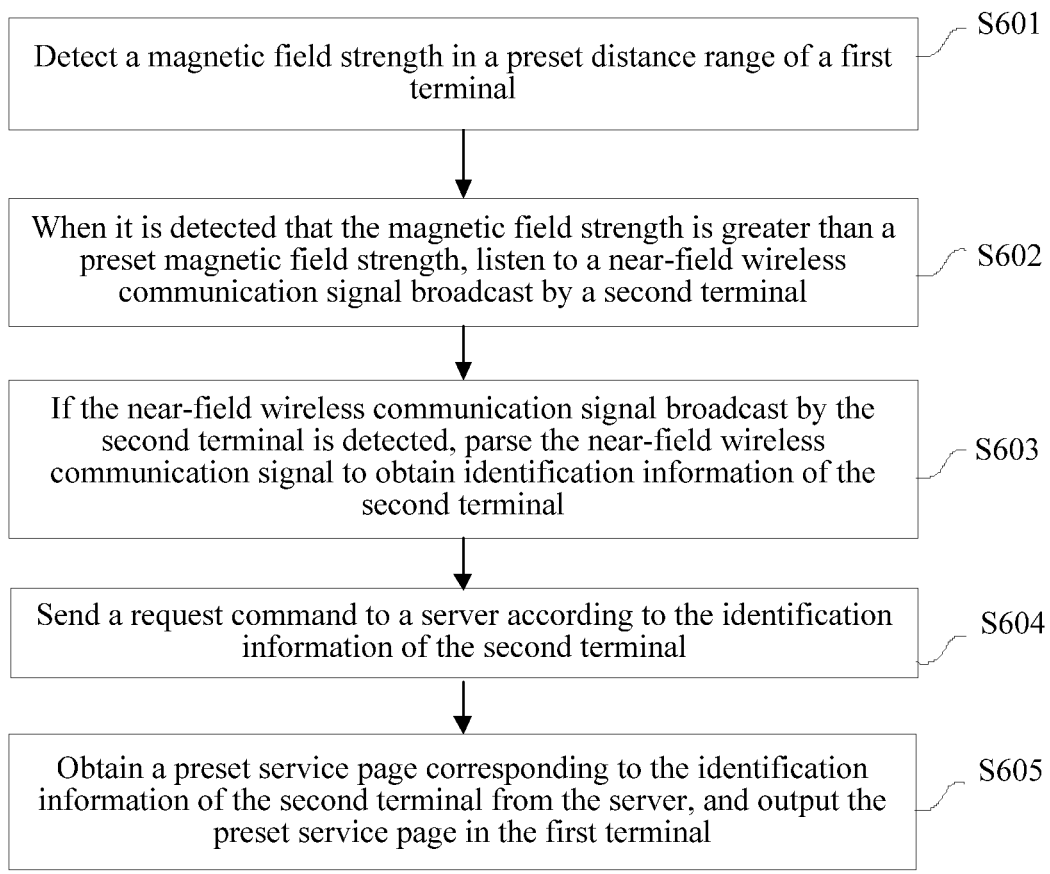
FIG. 6 is a flowchart of a service processing method according to an embodiment of this application.

In the foregoing running environment, an embodiment of this application provides a service processing method as shown in FIG. 6. FIG. 6 is a flowchart of a service processing method according to an embodiment of this application. The method may be applied to a smart terminal device and performed by a processor in the smart terminal device. The smart terminal device may be a smart phone, a PAD, or the like. At least one APP is stored in the smart terminal device. This embodiment of the present disclosure does not limit the type of the APP. The APP may be a system APP, or a software APP.

As shown in FIG. 6, the service processing method includes the following steps:

Step S601: Detect a magnetic field strength in a preset distance range of a first terminal.

In the solution provided by step S601 of this application, an APP invokes a first terminal to detect a magnetic field strength in a preset distance range of the first terminal. The APP is installed in the first terminal, and is used for receiving service information of a near-field service. The magnetic field strength is generated by a second terminal.

In this embodiment, the service processing method is mainly performed by using the APP. A detection apparatus for detecting a magnetic field strength of the second terminal is installed in the first terminal. The APP invokes the first terminal, so that the first terminal detects a magnetic field strength in a preset distance range by using the detection apparatus. The first terminal may be a mobile phone, a PAD, or the like, so that a user can carry and use the first terminal conveniently in different scenarios, and enjoy different preset scenario services by using the APP. The second terminal is disposed in a preset service scenario. The second terminal may be a fixed terminal installed with a magnet, for example, a Decca. The user enjoys a near-field service in the preset service scenario by using the first terminal. The near-field service may be a cashier payment service, a restaurant meal ordering service, an attach-based shopping mall guide service, a conference sign-in service at a conference table, or the like, so as to provide payment service information, meal ordering service information, shopping mall discount map information, conference sign-in information, and the like for the user. The second terminal is installed with a magnetic field emission apparatus configured to generate magnetic fields of different strengths nearby.

When the first terminal approaches the second terminal, the APP invokes the first terminal to detect a magnetic field strength in a preset distance range of the first terminal. When the magnetic field strength in the preset distance range of the first terminal is detected, the first terminal is located near the second terminal, and the APP can determine the location of the first terminal in the preset service scenario. Therefore, the APP can provide a near-field service for the user holding the first terminal according to the location in the preset service scenario.

Step S602: When it is detected that the magnetic field strength is greater than a preset magnetic field strength, listen to a near-field wireless communication signal broadcast by a second terminal.

Step S603: If the near-field wireless communication signal broadcast by the second terminal is detected, process the near-field wireless communication signal to obtain identification information of the second terminal.

In the solution provided by step S603 of this application, the second terminal has identification information. The identification information is an ID of the second terminal used for identifying the uniqueness of the second terminal. The second terminal may broadcast its ID around by using a configured low-power device. When the first terminal invoked by the APP detects the magnetic field strength in the preset distance range of the first terminal, the APP determines whether the magnetic field strength is greater than a preset magnetic field strength. If the magnetic field strength is greater than the preset magnetic field strength, the APP invokes the first terminal to search for the second terminal near the first terminal. The APP invokes the first terminal to listen to a near-field wireless communication signal broadcast by the second terminal, and detect, from the near-field wireless communication signal, the identification information used for identifying the second terminal. The APP can perform detection by scanning the identification information.

Step S604: Send a request command to a server according to the identification information of the second terminal.

In the solution provided by step S604 of this application, the APP sends a request command to a server according to the identification information of the second terminal. The server searches, according to the request command, for a preset service page that corresponds to the identification information of the second terminal and that is applied in the preset service scenario. The identification information of the second terminal and the preset service page are pre-configured in the server.

After invoking the first terminal to detect the identification information of the second terminal, the APP sends a request command to the server according to the identification information of the second terminal. The request command is a command for requesting the server to send preset service information corresponding to the identification information of the second terminal. The identification information of the second terminal and the preset service page applied in the preset service scenario are pre-configured in the server. The identification information of the second terminal and the preset service page have a one-to-one correspondence.

In some embodiments, a backend server of a merchant provides a standard page template of the near-field service. The merchant needs to fill in data content in the standard template, to generate a preset service page. The merchant can fill in the data content in the standard page template by using the backend server, or import the data content in the standard page template by using an interface. After filling in the data content in the standard template, the merchant needs to apply for identification information of the second terminal in the backend server, and establish a correspondence between the identification information of the second terminal and the preset service page. The merchant may modify, by using the APP on the first terminal, the identification information of the second terminal to be the identification information applied for by the merchant in the backend server, thereby establishing a correspondence among the second terminal, the identification information of the second terminal, and the preset service page.

After receiving the request command, the server searches for the preset service page corresponding to the identification information of the second terminal according to the request command, so that a service corresponding to the identification information of the second terminal can be searched for according to the identification information of the second terminal.

Step S605: Obtain a preset service page corresponding to the identification information of the second terminal from the server, and output the preset service page in the first terminal.

In the solution provided by step S605 of this application, after the APP sends the request command to the server according to the identification information of the second terminal, the server pushes service information corresponding to the found preset service page to the APP on the first terminal according to the identification information of the second terminal. The APP obtains the service information corresponding to the preset service page. For example, the APP is a WeChat client, and the server is a WeChat platform. After receiving the request command, the WeChat platform searches for service information corresponding to the identification information of the second terminal, and pushes the service information to the APP of the WeChat client, so that the user can automatically obtain the service information in the service scenario when using WeChat.

By means of step S601 to step S605 above, an APP invokes a first terminal to detect a magnetic field strength in a preset distance range of the first terminal; if the detected magnetic field strength is greater than a preset magnetic field strength, the APP invokes the first terminal to detect identification information of a second terminal broadcast by the second terminal; then the APP sends a request command to a server according to the identification information of the second terminal; further, the server searches, according to the request command, for a preset service page that corresponds to the identification information of the second terminal and that is applied in a preset service scenario; and finally, the APP obtains service information corresponding to the preset service page. Therefore, the solution provided by this application has features of a low operation threshold for users, a high response speed, and smooth experience, and can be used as a near-field service and marketing solution for various offline vertical industries, so that service information in a service scenario can be obtained automatically.

In an optional implementation, the preset service page has a uniform resource locator. The APP receives the uniform resource locator of the preset service page sent by the server, to access an address of the service information corresponding to the preset service page on the Internet, and further obtain the service information corresponding to the preset service page according to the address of the service information.

Figure 7:
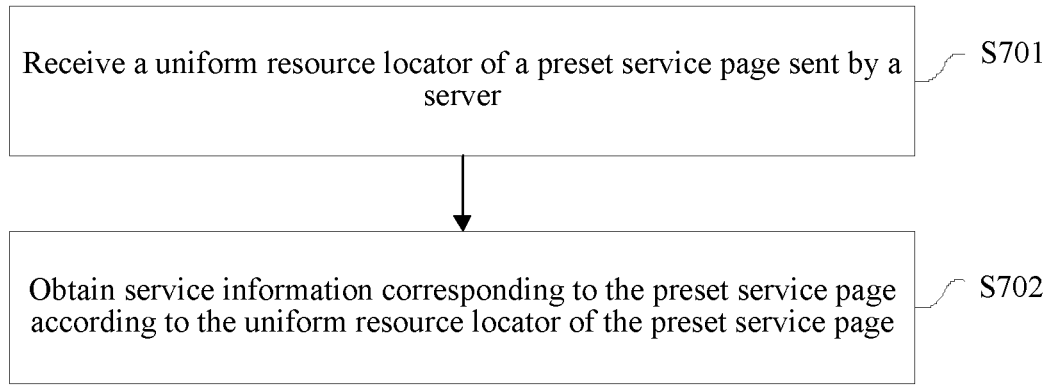
FIG. 7 is a flowchart of a method for obtaining a preset service page corresponding to identification information of a second terminal from a server according to an embodiment of this application.

FIG. 7 is a flowchart of a method for obtaining a preset service page corresponding to identification information of a second terminal from a server according to an embodiment of this application. As shown in FIG. 7, the method for obtaining a preset service page corresponding to identification information of a second terminal from a server includes the following steps:

Step S701: Receive a uniform resource locator of the preset service page sent by the server.

In the solution provided by step S701 of this application, the APP receives a uniform resource locator of the preset service page sent by the server. The uniform resource locator is used for denoting a storage location and an access method of a resource on the Internet, and is an address of a standard resource on the Internet. After searching for the preset service page corresponding to the identification information of the second terminal according to the request command, the server sends the uniform resource locator of the preset service page to the first terminal. The APP requests the uniform resource locator of the preset service page, so as to receive the uniform resource locator of the preset service page sent by the server.

Step S702: Obtain service information corresponding to the preset service page according to the uniform resource locator of the preset service page.

In the solution provided by step S702 of this application, the APP obtains service information corresponding to the preset service page according to the uniform resource locator of the preset service page. After receiving the uniform resource locator of the preset service page sent by the server, the APP determines, according to the uniform resource locator of the preset service page, a storage location and an access method of the service information corresponding to the preset service page, so as to obtain the service information corresponding to the preset service page at the storage location of the service information corresponding to the preset service page according to the access method of the service information.

In this embodiment, the APP receives a uniform resource locator of the preset service page sent by the server, and then obtains service information corresponding to the preset service page according to the uniform resource locator of the preset service page. The service information in a service scenario can be obtained automatically.

In an optional implementation, the second terminal has an iBeacon-based positioning function, and is configured to send a beacon signal. The step of invoking, by the APP, the first terminal to detect identification information of a second terminal broadcast by the second terminal includes: invoking, by the APP, the first terminal to detect a beacon signal. The step of sending, by the APP, a request command to a server according to the identification information of the second terminal includes: sending, by the APP, a request command to a server according to the beacon signal, where the server searches for a preset service page corresponding to the beacon signal according to the request command.

The iBeacon positioning function, launched by Apple Inc., is a BLE-based precise positioning function. A device configured with a BLE communication function sends its unique ID around. APP software of a mobile device receiving the ID responds to the received ID. For example, an iBeacon communication module is disposed in a restaurant, and can enable iPhone and iPad to run some information and inform the server. The second terminal in this embodiment is a fixed terminal in the preset service scenario. The second terminal includes a magnet and has an iBeacon positioning function. For example, the second terminal is a Decca in the restaurant.

When the APP invokes the first terminal to detect identification information of the second terminal broadcast by the second terminal, a Bluetooth function of the first terminal is enabled, and the first terminal is moved close to the second terminal, to identify a strong magnetic field around the second terminal, so as to detect a beacon signal sent by the second terminal. In some embodiments, the APP scans the beacon signal. Then, the APP sends a request command to the server according to the beacon signal, where the server searches for a preset service page corresponding to the beacon signal according to the request command. The server may search for a uniform resource locator of the preset service page corresponding to the beacon signal according to the request command, and return the uniform resource locator to the first terminal. The APP on the first terminal requests the uniform resource locator of the preset service page, and further obtains service information of the preset service page according to the uniform resource locator. As such, the service information of the preset service page can be obtained based on the magnet and the iBeacon positioning function and by using a magnetic induction mechanism as a triggering condition for obtaining the service information, so that the APP can obtain the service information in the service scenario automatically, bringing a smoother experience effect to users, thereby bringing about new opportunities for an offline ecological environment of the APP.

In some embodiments, after filling in the data content in the standard template, the merchant needs to apply for an ID of the second terminal in the backend server, and establish a correspondence between the ID of the second terminal and the preset service page. The merchant may modify, in a near field by using the APP on the first terminal, a beacon ID of the second terminal having the iBeacon positioning function to be the beacon ID applied for by the merchant in the backend server, thereby establishing a correspondence among the second terminal, the beacon ID of the second terminal, and the preset service page.

In an optional implementation, the second terminal has a WiFi-based positioning function, and is configured to send a WiFi signal. The step of invoking, by the APP, the first terminal to detect identification information of a second terminal broadcast by the second terminal includes: invoking, by the APP, the first terminal to detect a WiFi signal. The step of sending, by the APP, a request command to a server according to the identification information of the second terminal includes: sending, by the APP, a request command to a server according to the WiFi signal, where the server searches for a preset service page corresponding to the WiFi signal according to the request command.

The second terminal has a function of positioning based on a WiFi signal. The second terminal is hardware that includes a magnet and has a WiFi positioning function. The second terminal may be a Decca of a restaurant. A Bluetooth function of the first terminal is enabled, and the first terminal is moved close to the second terminal, to identify a strong magnetic field, so as to detect a WiFi signal of the second terminal. In some embodiments, the APP scans the WiFi signal. Then, the APP sends a request command to the server according to the WiFi signal, where the server searches for a preset service page corresponding to the WiFi signal according to the request command. The server may search for a uniform resource locator of the preset service page corresponding to the WiFi signal according to the request command, and return the uniform resource locator to the first terminal. The APP on the first terminal requests the uniform resource locator of the preset service page, and further obtains service information of the preset service page according to the uniform resource locator. As such, the service information of the preset service page can be obtained based on the magnet and the WiFi positioning function and by using a magnetic induction mechanism as a triggering condition for obtaining the service information, so that the APP can obtain the service information in the service scenario automatically, bringing a brand new smoother experience effect to users, thereby creating a new condition for an offline ecological environment of the APP.

In some embodiments, after filling in the data content in the standard template, the merchant needs to apply for an ID of the second terminal in the backend server, and establish a correspondence between the ID of the second terminal and the preset service page. The merchant may modify, in a near field by using the APP on the first terminal, identification information of the second terminal having the WiFi positioning function to be the identification information applied for by the merchant in the backend server, thereby establishing a correspondence among the second terminal, the identification information of the second terminal, and the preset service page.

In an optional implementation, the step of obtaining, by the APP, service information corresponding to the preset service page is implemented as follows: an instant messaging APP obtains the service information corresponding to the preset service page.

The instant messaging APP is installed on the first terminal. For example, the first terminal is a mobile phone, and the WeChat APP is installed on the mobile phone. The user enables the Bluetooth function of the first terminal, and attaches the first terminal to the second terminal. The first terminal identifies a strong magnetic field of the second terminal, and the instant messaging APP is started. The instant messaging APP scans identification information of the second terminal. For example, the second terminal has an iBeacon positioning function, and the instant messaging APP scans a beacon signal of the second terminal. After being started, the instant messaging APP obtains service information corresponding to the preset service page. The instant messaging APP may request to obtain a uniform resource locator of the preset service page, and obtain a storage location and an access method of the service information corresponding to the preset service page according to the uniform resource locator of the preset service page, thereby obtaining the service information corresponding to the preset service page. The service information corresponding to the preset service page is pushed by an instant messaging APP platform. In some embodiments, when the instant messaging APP is the WeChat APP, the service information corresponding to the preset service page is pushed by the WeChat platform.

In this embodiment, the instant messaging APP obtains the service information corresponding to the preset service page, and the service information corresponding to the preset service page is pushed by the WeChat platform, so that service information in a service scenario can be obtained automatically.

In an optional implementation, the step of invoking, by the APP, the first terminal to detect a magnetic field strength in a preset distance range of the first terminal includes: invoking, by the APP, the first terminal to detect the magnetic field strength in the preset distance range of the first terminal by using a magnetic sensor, where the magnetic sensor is used by the first terminal to sense the magnetic field strength and a magnetic field direction.

The magnetic sensor is disposed on the first terminal, and is used by the first terminal to sense the magnetic field strength and the magnetic field direction of the magnetic field generated by the second terminal in the preset distance range. When the magnetic sensor detects that the magnetic field strength is greater than the preset magnetic field strength, the APP triggers the first terminal to poll the identification information, and return service information corresponding to the detected identification information. For example, the identification information is an iBeacon signal or a WiFi signal; when the magnetic sensor detects that the magnetic field strength is greater than the preset magnetic field strength, the APP triggers the first terminal to poll the iBeacon signal or the WiFi signal, return service information corresponding to the detected iBeacon signal or WiFi signal, and call, in response to the iBeacon signal or the WiFi signal, an original action or a service page in the APP for receiving service information of a near-field service. The mechanism that a magnetic sensor triggers scanning of the first terminal is used as a control switch for determining a near-field service scenario, thus effectively reducing impact of a continuous scanning signal on the battery and hardware service life of the mobile phone, and improving the sensitivity of automatically determining a service scenario. The magnetic sensor is more popularized than other sensors. Therefore, more users can experience automatic obtaining of service information in a service scenario by a first terminal installed with a magnetic sensor, and it is ensured that users can experience service information of a preset service page more smoothly.

The technical solution of this application is described below with reference to some embodiments.

The technical solution of an embodiment of this application can be applied to WeChat Attach. In this embodiment, the first terminal is a mobile phone that is installed with the WeChat APP and that has a mobile phone Bluetooth/WiFi function. The second terminal is a Decca that includes a magnet and that has an iBeacon function, or a Decca that has a magnet and that has a WiFi function. By enabling the Bluetooth/WiFi function of the mobile phone and attaching the mobile phone to a Decca, the user can call a WeChat original page/service/action function in a preset service scenario rapidly. In some embodiments, common preset service scenarios include a scenario of multi-person simultaneous meal ordering by attaching to a dinner table Decca, a scenario of obtaining a shopping mall discount map by attaching to a guide desk of a shopping mall, a scenario of conference sign-in by attaching to a conference table, and the like. As an offline content and service connection capability in the WeChat APP, the WeChat Attach has immeasurable commercial value.

This embodiment is applied to attachment in the catering industry. A merchant of a restaurant deploys a Decca in advance. After entering the restaurant and getting seated, a user enables a Bluetooth function of a mobile phone according to the guidance of the Decca, and moves the mobile phone close to the Decca. The mobile phone detects a magnetic field strength generated by the Decca in a preset distance range. When the detected magnetic field strength is greater than a preset magnetic field strength, the mobile phone detects identification information of the Decca, and sends a request command to a server according to the identification information of the Decca. The server searches, according to the request command, for a meal ordering service page that corresponds to the identification information of the Decca and that is applied in the meal ordering scenario. Finally, the WeChat APP obtains service information corresponding to the meal ordering service page. The identification information of the Decca and the meal ordering service page are pre-configured in the server.

Figure 8:
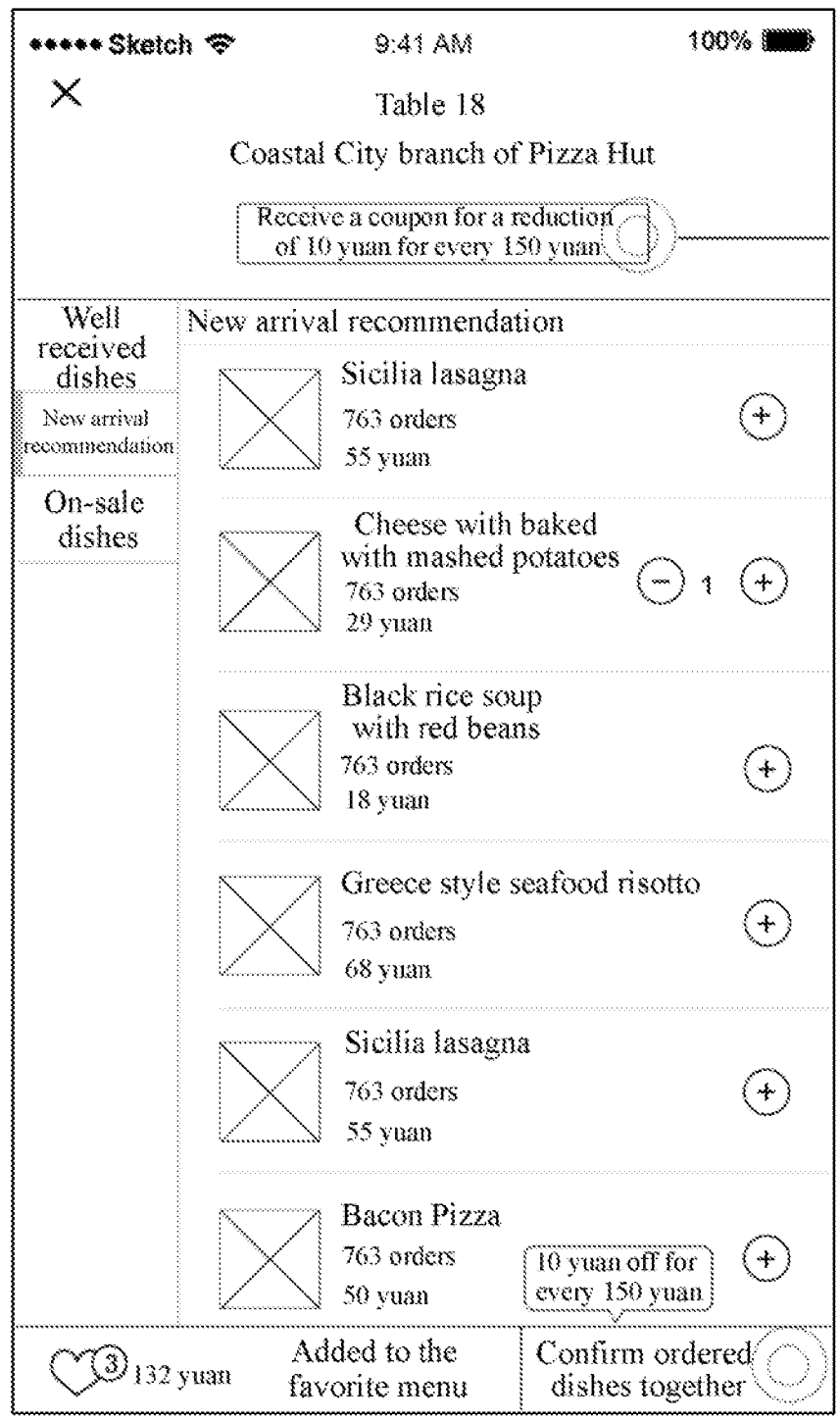
FIG. 8 is a schematic diagram of a WeChat original meal ordering page according to an embodiment of this application.

FIG. 8 is a schematic diagram of a WeChat original meal ordering page according to an embodiment of this application. As shown in FIG. 8, a WeChat original meal ordering page of a Coastal City branch of Pizza Hut is opened in the WeChat APP by means of attachment. The original meal ordering page is a preset service page, and displays meal ordering service information corresponding to the meal ordering service page. For example, dishes currently provided by the restaurant are displayed. The meal ordering page includes a new arrival recommendation page for selecting new dishes, and an on-sale dish page for selecting on-sale dishes. In addition, the meal ordering page further displays a function entry for adding dishes to a favorite menu. The function entry is used for adding dishes selected on the meal ordering page to the favorite menu.

Figure 9A:
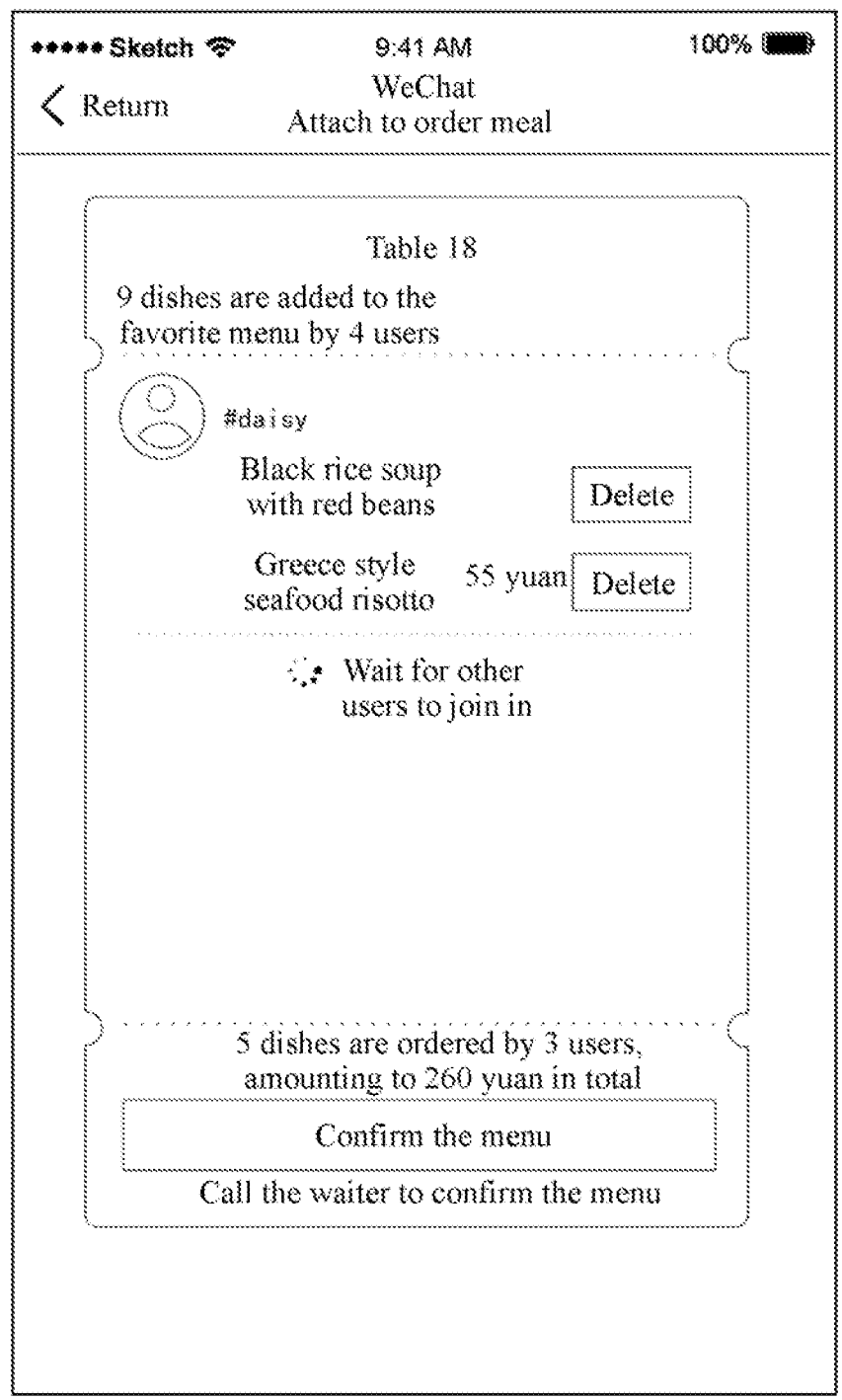
FIG. 9A is a schematic diagram of a group meal ordering page according to an embodiment of this application.

FIG. 9A is a schematic diagram of a group meal ordering page according to an embodiment of this application. As shown in FIG. 9A, multiple users enter a meal ordering group page simultaneously by means of the WeChat Attach APP. For example, 4 users add 9 dishes to the favorite menu, where the dishes include black rice soup with red beans, Greece style seafood risotto, and so on. Moreover, the page can also wait for other users to join in the meal ordering group. After finishing ordering dishes, the user may delete ordered dishes by using a deletion icon beside the ordered dishes on the group meal ordering page. In addition, the group meal ordering page preliminarily displays the quantity of users currently ordering meals, the quantity of ordered dishes, and the total amount of money for the ordered dishes. For example, in the meal ordering group, 6 dishes are ordered by 3 users, amounting to 289 yuan in total. As such, the users ordering meals can clearly know the current meal ordering status, so as to adjust ordered dishes in time.

Figure 9B:
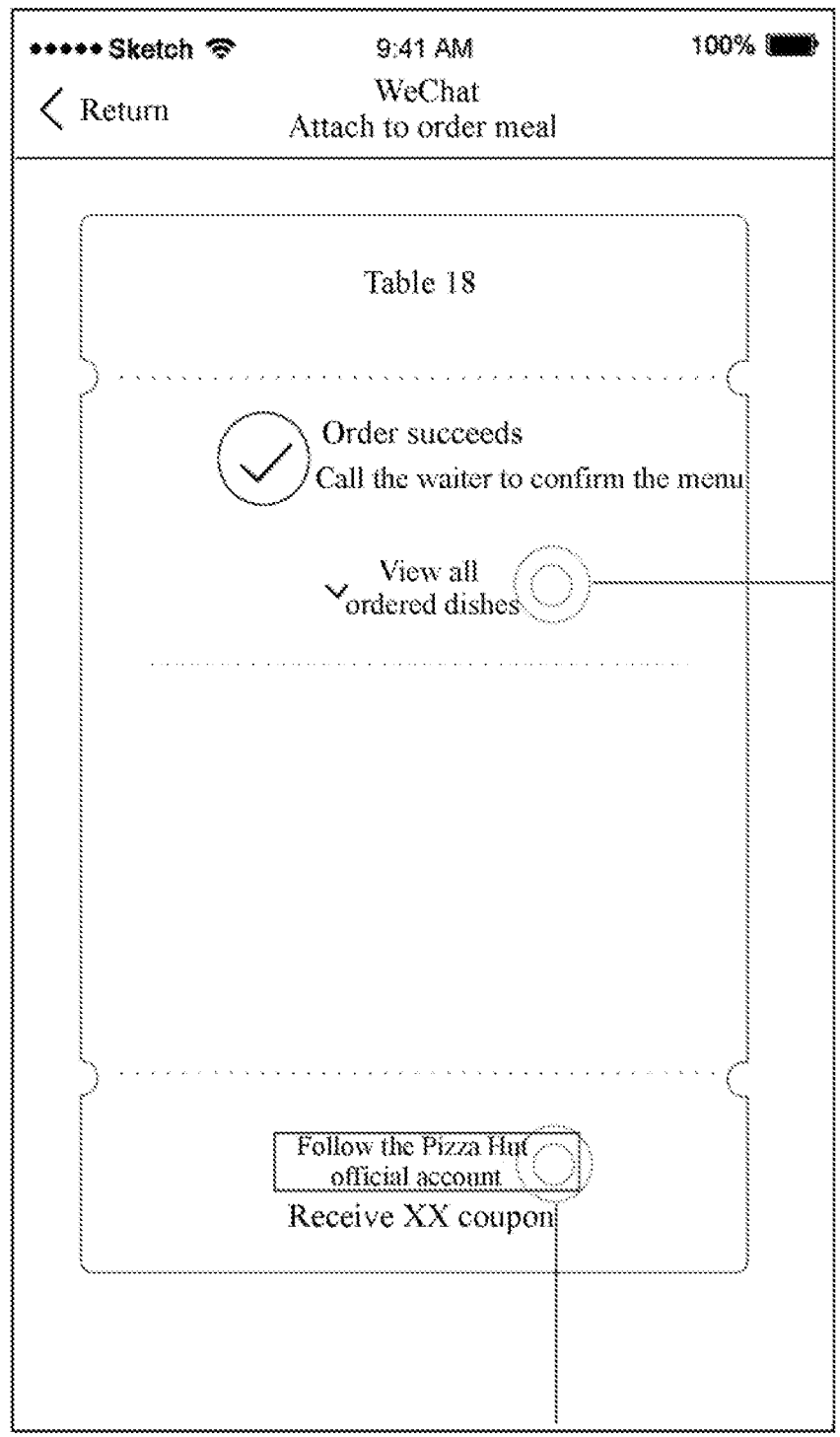
FIG. 9B is a schematic diagram of a group meal ordering page according to an embodiment of this application.

FIG. 9B is a schematic diagram of a group meal ordering page according to an embodiment of this application. As shown in FIG. 9B, after finishing ordering meals, multiple users click a function entry corresponding to "confirm ordered dishes together" on the group meal ordering page, and then, the order succeeds. The users call a waiter by using a function entry corresponding to "call the waiter to confirm the order", to confirm a meal ordering result of the group. The group meal ordering page displays a function entry corresponding to "view all dishes", to prompt the user to view order menus of all members in the group as needed, so as to know dishes ordered currently. In addition, the group meal ordering page displays a function entry corresponding to "follow Pizza Hut official account". The user can select a function corresponding to "follow Pizza Hut official account" as needed, to follow the Pizza Hut official account. The page further displays a function entry corresponding to "receive XX coupon", to prompt the user to receive the XX coupon, so as to use the coupon in dining next time.

Figure 9C:
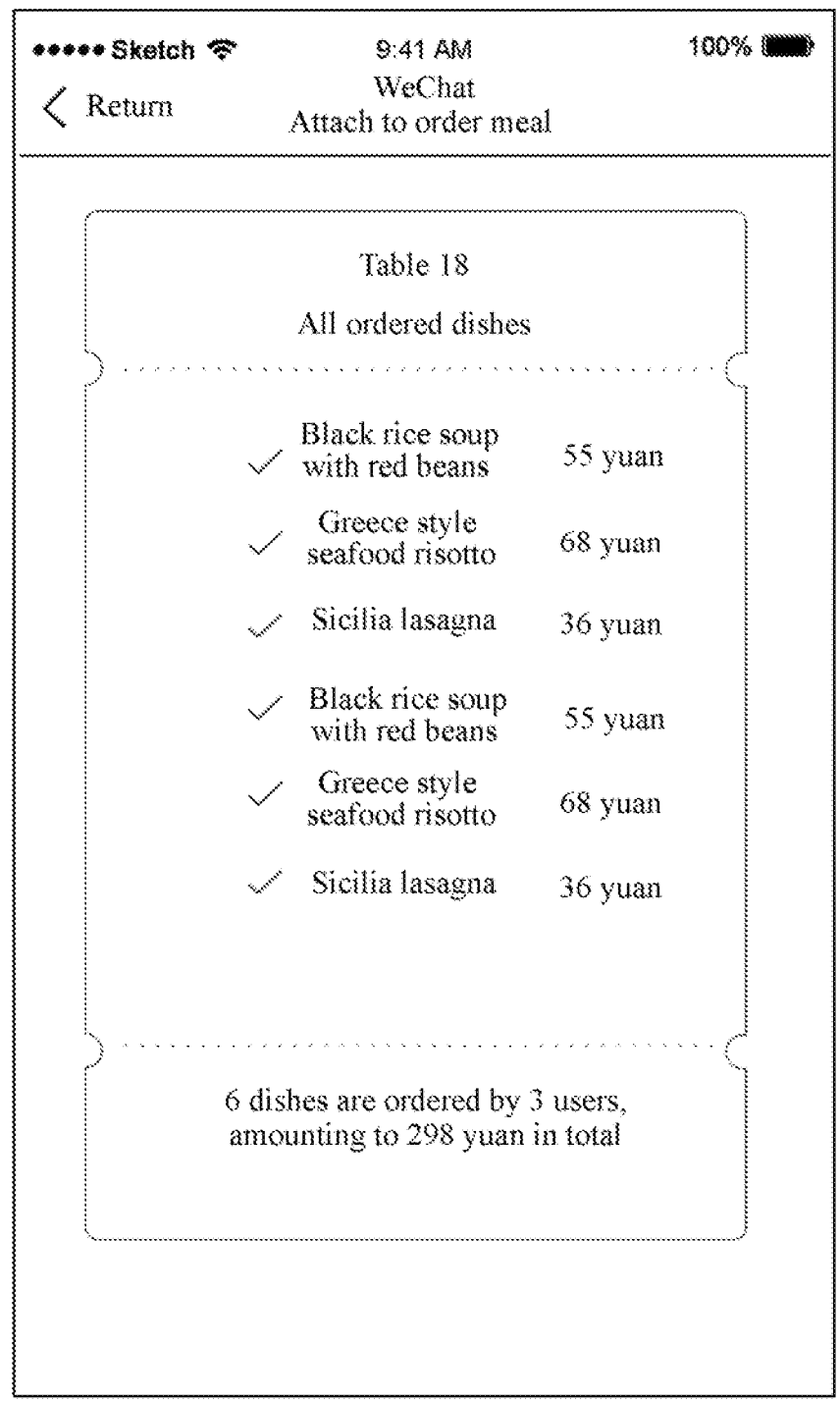
FIG. 9C is a schematic diagram of a group meal ordering page according to an embodiment of this application.

FIG. 9C is a schematic diagram of a group meal ordering page according to an embodiment of this application. As shown in FIG. 9C, the user can view order menus of all members in the group as needed. When the user enters the function entry corresponding to "view all dishes", the group meal ordering page displays all dishes ordered by the meal ordering group. For example, the page displays dishes such as "black rice soup with red beans", "Greece style seafood risotto", and "Sicilia lasagna", as well as prices corresponding to the dishes. In addition, the group meal ordering page displays the final quantity of users ordering meals, the final quantity of ordered dishes, to final total amount of money for the ordered dishes. For example, in the meal ordering group, 6 dishes are ordered by 3 users, amounting to 289 yuan in total.

Figure 10A:
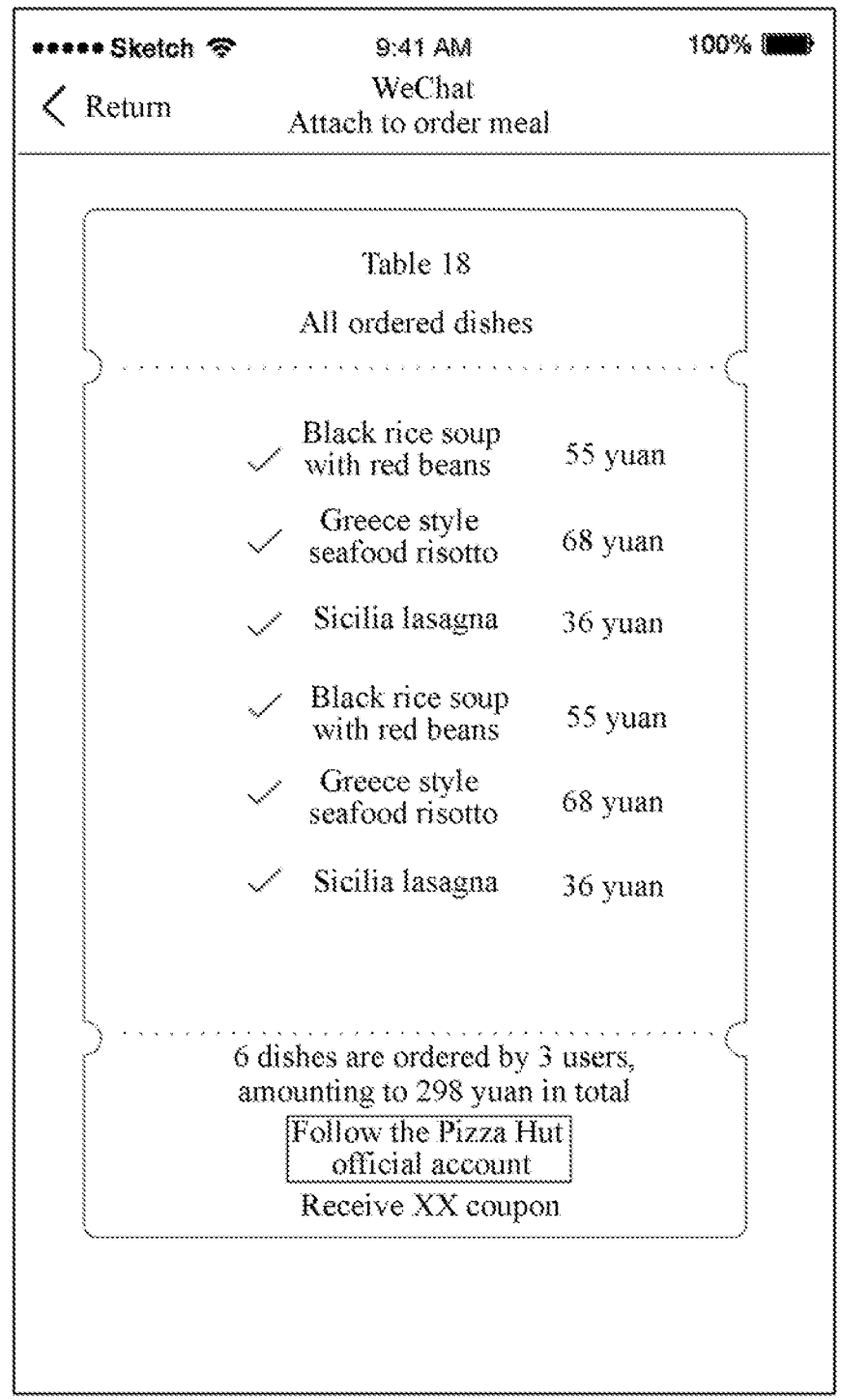
FIG. 10A is a schematic diagram of an order placing page according to an embodiment of this application.

FIG. 10A is a schematic diagram of an order placing page according to an embodiment of this application. As shown in FIG. 10A, after the meal ordering group confirms that the order is placed, the meal ordering process is finished, and a menu of dishes currently ordered by the meal ordering group is displayed. For example, "black rice soup with red beans", "Greece style seafood risotto", "Sicilia lasagna" and the like, as well as prices corresponding to the dishes are displayed. In addition, the group meal ordering page displays the final quantity of users ordering meals, the quantity of ordered dishes, and the total amount of money for the ordered dishes. In this case, the page of the placed order is synchronized on mobile phone pages of all the members in the meal ordering group. The group meal ordering page displays a function entry corresponding to "follow Pizza Hut official account", to guide the members of the meal ordering group to follow the official account of the merchant. In addition, the page further displays a function entry corresponding to "receive XX coupon", to prompt the user to receive the XX coupon, so as to use the coupon in dining next time.

Figure 10B:
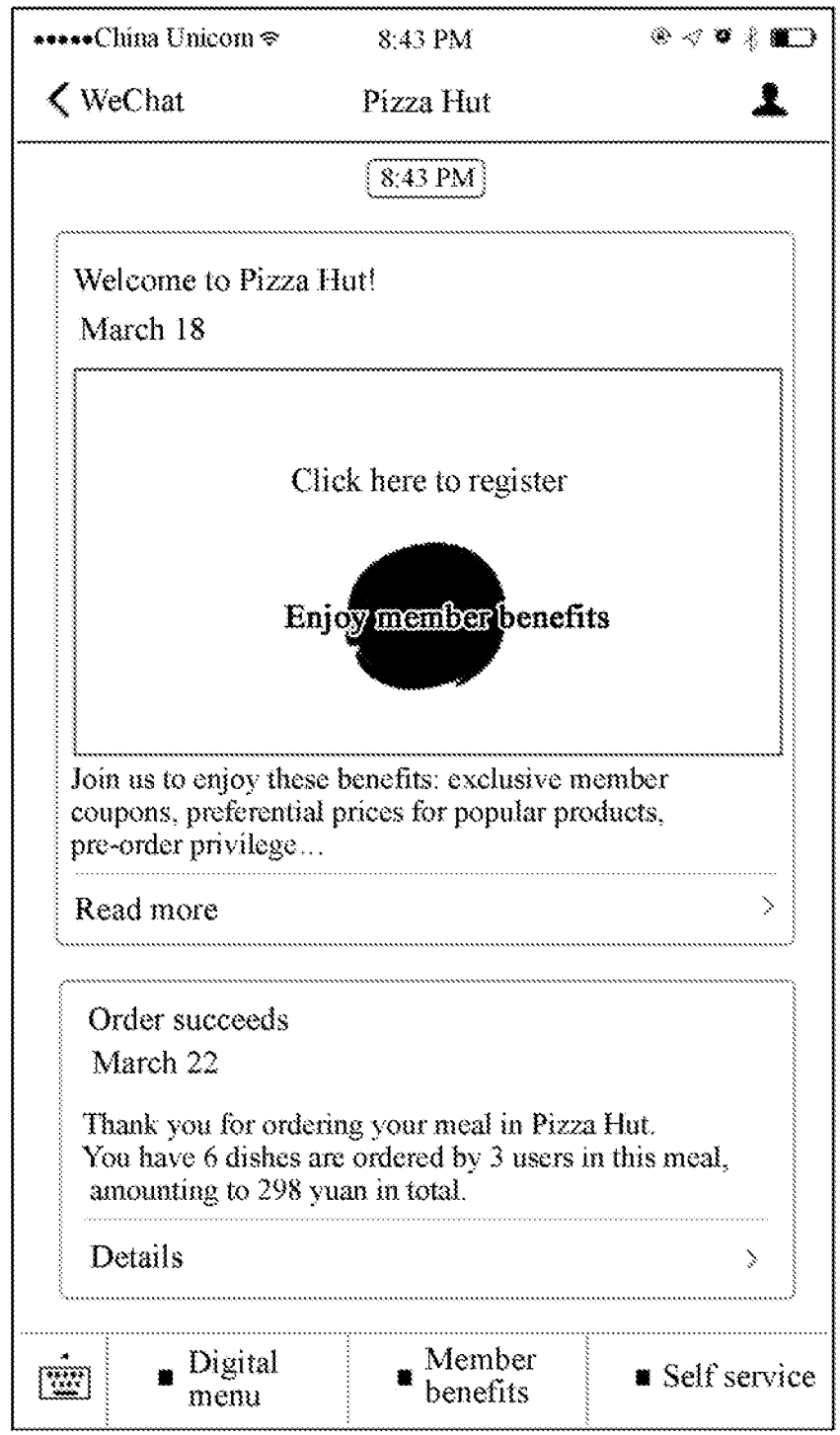
FIG. 10B is a schematic diagram of an order placing page according to an embodiment of this application.

FIG. 10B is a schematic diagram of an order placing page according to an embodiment of this application. As shown in FIG. 10B, after following the official account of the merchant by means of the function entry corresponding to "follow Pizza Hut official account" on the group meal ordering page, a followed service page "Welcome to Pizza Hut!" is displayed. The service page displays service information provided by the merchant of the restaurant, including "member benefits", "order succeeds", and other information, so that the user can automatically obtain service information in a service scenario when using WeChat.

The foregoing embodiment is applied to WeChat Attach. When Bluetooth/WiFi of the mobile phone is enabled, the user can call a WeChat original page/service/action function rapidly by attaching the mobile phone to a Decca. Therefore, the embodiment achieves features of a low operation threshold for users, a high response speed, and smooth experience, and can be used as a near-field service and marketing solution for various offline vertical industries, so that service information in a service scenario can be obtained automatically.

Figure 11:
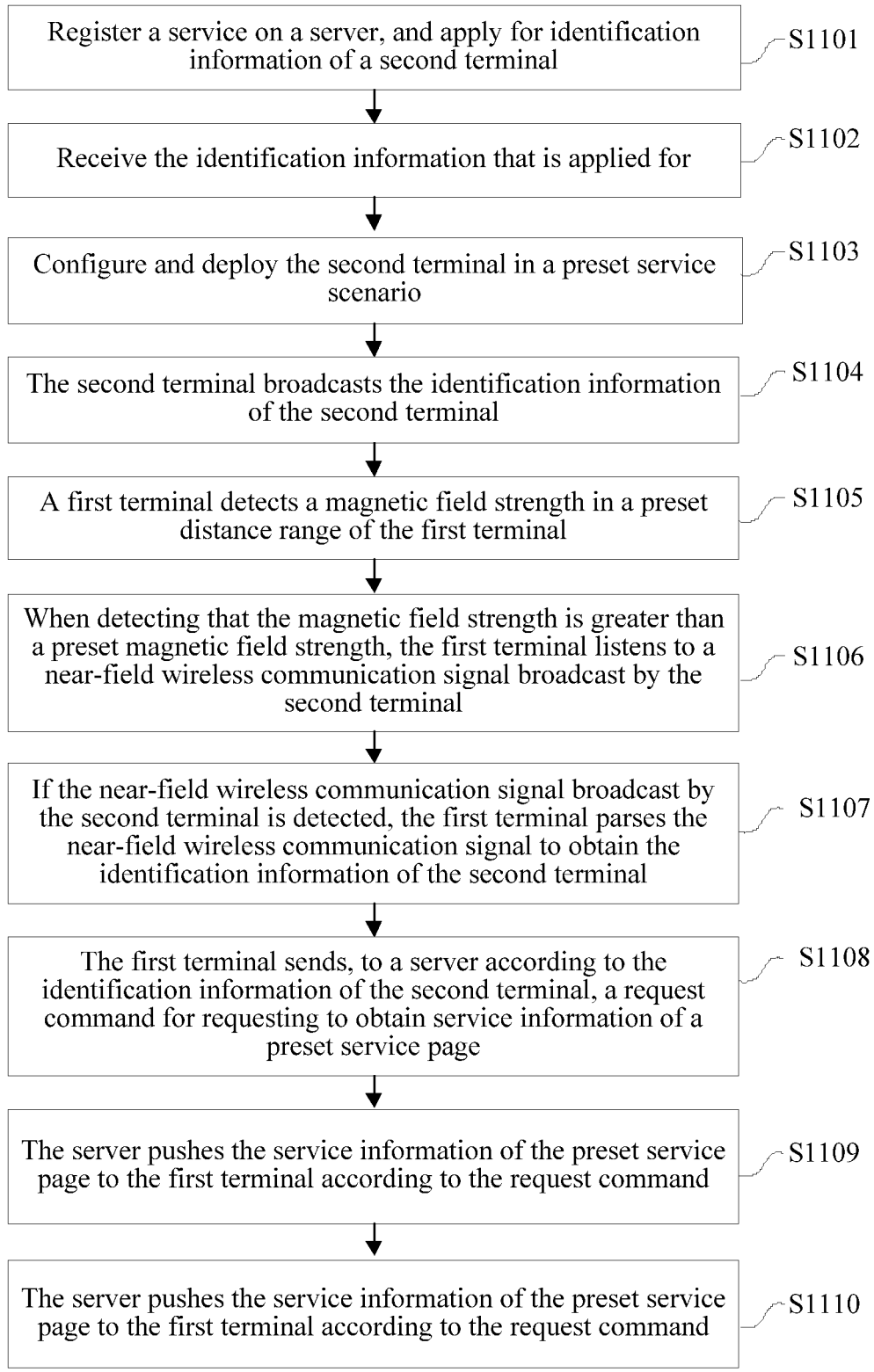
FIG. 11 is a flowchart of a service processing method according to an embodiment of this application.

FIG. 11 is a flowchart of a service processing method according to an embodiment of this application. As shown in FIG. 11, the service processing method includes the following steps:

Step S1101: Register a service on a server, and apply for identification information of a second terminal.

A server provides a standard page template. A service provider registers a service on the standard page template by using, for example, an instant messaging APP in a mobile phone or computer. When registering the service on the server, the service provider needs to fill in data content in the standard template, to generate a preset service page. The service provider can fill in the data content in the standard page template by using a backend server, or import the data content in the standard template by using an interface. The service provider applies for identification information of a second terminal, and establishes a correspondence between the identification information of the second terminal and the preset service page. In some embodiments, the service provider needs to modify, by using a mobile phone APP in a near field, a beacon ID of the second terminal having an iBeacon positioning function to be a beacon ID applied for by the service provider in the server, thereby establishing a correspondence among iBeacon hardware, the beacon ID, and the preset service page. In some embodiments, the WiFi SSID-based solution employs a principle identical to the aforementioned principle.

Step S1102: Receive the identification information that is applied for.

The server examines the identification information of the second terminal, to determine whether the identification information of the second terminal meets a preset condition. If the identification information of the second terminal meets the preset condition, it is determined that the identification information of the second terminal passes the examination of the server, and the server sends the identification information of the second terminal to the APP in the mobile phone or computer of the service provider.

Step S1103: Configure and deploy the second terminal in a preset service scenario.

The service provider configures and deploys the second terminal in a preset service scenario. In some embodiments, common preset service scenarios include a scenario of multi-person simultaneous meal ordering by attaching to a dinner table Decca, a scenario of obtaining a shopping mall discount map by attaching to a guide desk of a shopping mall, a scenario of conference sign-in by attaching to a conference table, and the like.

Step S1104: The second terminal broadcasts the identification information of the second terminal.

After the service provider configures and deploys the second terminal in the preset service scenario, the second terminal broadcasts its own identification information. The second terminal is configured with a BLE communication function and can send its unique ID around. The second terminal may be a terminal including a magnet and having an iBeacon positioning function, and sends beacon signals around. The second terminal may also be a terminal including a magnet and having a WiFi positioning function, and sends WiFi signals around.

Step S1105: A first terminal detects a magnetic field strength in a preset distance range of the first terminal.

Step S1106: When detecting that the magnetic field strength is greater than a preset magnetic field strength, the first terminal listens to a near-field wireless communication signal broadcast by the second terminal.

Step S1107: If the near-field wireless communication signal broadcast by the second terminal is detected, the first terminal processes the near-field wireless communication signal to obtain the identification information of the second terminal.

The first terminal detects a magnetic field strength in a preset distance range of the first terminal, and detects the identification information of the second terminal when the magnetic field strength is greater than a preset magnetic field strength. That is, when the magnetic field strength is greater than a triggering threshold, the first terminal starts to search for the second terminal nearby, and detects the identification information of the second terminal.

Step S1108: The first terminal sends, to a server according to the identification information of the second terminal, a request command for requesting to obtain service information of a preset service page.

An APP on the first terminal sends, to a server according to the identification information of the second terminal, a request command for requesting to obtain service information of a preset service page. The APP on the first terminal may be the WeChat APP, and the server may be the WeChat platform. The WeChat APP may send, to the WeChat platform according to the found identification information of the second terminal, a request command for requesting to obtain service information of a preset service page.

Step S1109: The server pushes the service information of the preset service page to the first terminal according to the request command.

After the APP on the first terminal sends, to the server according to the identification information of the second terminal, the request command for requesting to obtain the service information of the preset service page, the server searches for the preset service page corresponding to the identification information of the second terminal according to the request command, and pushes service information of the preset service page to the APP on the first terminal.

Step S1110: The first terminal obtains the preset service page corresponding to the identification information of the second terminal from the server, and outputs the preset service page in the first terminal.

In some embodiments, for operations on a merchant side, in this embodiment, the server provides a standard page template for the backend of the merchant. The merchant needs to fill in data content in the template, to generate a preset service page. The merchant can fill in the data content in the page template by using the server, or import the data content by using an interface. The merchant needs to apply for a device ID in the backend and establish a correspondence between the device ID and the page. The merchant needs to modify, by using a mobile phone APP in a near field, a beacon ID of the iBeacon device to be a beacon ID applied for by the merchant in the backend. By using the foregoing three steps, a correspondence among iBeacon hardware, the beacon ID, and the preset service page can be established. A WiFi SSID-based solution employs a principle identical to the aforementioned principle.

In some embodiments, for operations in a client process, the APP on the second terminal is the WeChat client. The user enables Bluetooth, and attaches the mobile phone to a Decca installed with a magnet and an iBeacon device. The mobile phone identifies a strong magnetic field, and the WeChat starts to scan beacon signals. The mobile phone requests attachment to the backend server according to the scanned beacon signal, searches for a uniform resource locator of a preset page that is configured by the merchant and that corresponds to the beacon signal, and returns the uniform resource locator to the WeChat client. The WeChat client requests to obtain the uniform resource locator of the preset page, and obtains a service or information in a preset service scenario according to the uniform resource locator of the preset page.

In this embodiment, the mechanism that a magnetic sensor triggers scanning is used as a switch for determining a preset scenario of a near-field service, thus effectively reducing impact of a continuous scanning signal on the battery and hardware service life of the mobile phone, and improving the sensitivity of automatically determining a service scenario. The magnetic sensor is more popularized than other sensors. Therefore, more users can enjoy smooth offline experience.

In some embodiments, the WeChat Attach may substitute a data plane of this application by using a Google eddystone technique.

It should be noted that, for ease of description, the foregoing method embodiments are described as a series of action combinations. However, this application is not limited to the described sequence of the actions, because some steps may be performed in another sequence or performed at the same time according to this application. In addition, the related actions and modules in the embodiments described in the specification are not necessarily required in this application.

Through the descriptions of the preceding embodiments, it can be understood clearly that the methods according to the foregoing embodiments may be implemented by software and a necessary universal hardware platform. Definitely, the methods can also be implemented by hardware. However, in most cases, the former is a preferred implementation. Based on such an understanding, the technical solutions of this application essentially, or the part contributing to the prior art may be implemented in the form of a software product. The computer software product is stored in a storage medium, such as a read-only memory (ROM)/RAM, a magnetic disk, or an optical disc, and includes several instructions for instructing a terminal device (which may be a mobile phone, a computer, a server, a network device, or the like) to perform the methods described in the embodiments of this application.

Figure 12:
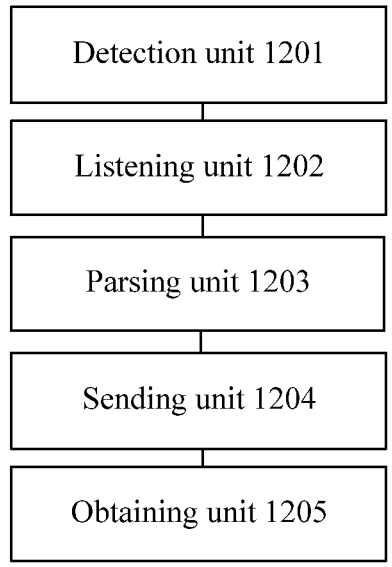
FIG. 12 is a schematic diagram of a service processing apparatus according to an embodiment of this application.

According to an embodiment of this application, an apparatus for implementing the foregoing service processing method is provided. FIG. 12 is a schematic diagram of a service processing apparatus according to an embodiment of this application. As shown in FIG. 12, the service processing apparatus includes: a detection unit 1201, a listening unit 1202, a processing unit 1203, a sending unit 1204, and an obtaining unit 1205.

The detection unit 1201 is configured to detect a magnetic field strength in a preset distance range of a first terminal.

The detection unit 1201 is configured to enable an APP to invoke the first terminal to detect a magnetic field strength in a preset distance range. The APP is installed in the first terminal, and is configured to receive service information of a near-field service. The magnetic field strength is generated by a second terminal.

The listening unit 1202 is configured to: when it is detected that the magnetic field strength is greater than a preset magnetic field strength, listen to a near-field wireless communication signal broadcast by the second terminal.

The processing unit 1203 is configured to: if the near-field wireless communication signal broadcast by the second terminal is detected, process the near-field wireless communication signal to obtain identification information of the second terminal.

The sending unit 1204 is configured send a request command to a server according to the identification information of the second terminal. The server searches, according to the request command, for a preset service page that corresponds to the identification information of the second terminal and that is applied in a preset service scenario. The identification information of the second terminal and the preset service page are pre-configured in the server.

The obtaining unit 1205 is configured to obtain a preset service page corresponding to the identification information of the second terminal from the server, and output the preset service page in the first terminal.

In the apparatus with displayed icons in this embodiment, the detection unit 1201 may be configured to perform step S601 in the embodiment of this application; the listening unit 1202 may be configured to perform step S602 in the embodiment of this application; the processing unit 1203 may be configured to perform step S603 in the embodiment of this application; the sending unit 1204 may be configured to perform step S604 in the embodiment of this application; and the obtaining unit 1205 may be configured to perform step S605 in the embodiment of this application.

Figure 13:
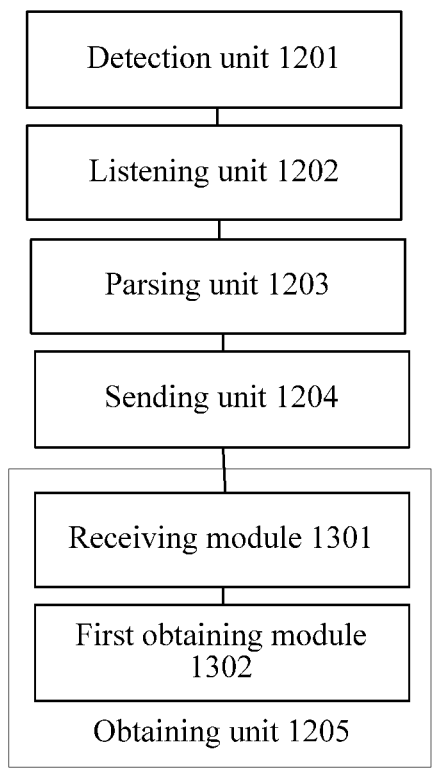
FIG. 13 is a schematic diagram of a service processing apparatus according to an embodiment of this application.

FIG. 13 is a schematic diagram of a service processing apparatus according to an embodiment of this application. As shown in FIG. 13, the service processing apparatus includes: a detection unit 1201, a listening unit 1202, a processing unit 1203, a sending unit 1204 and an obtaining unit 1205. The obtaining unit 1205 includes: a receiving module 1301 and a first obtaining module 1302.

The detection unit 1201, the listening unit 1202, the processing unit 1203, the sending unit 1204 and the obtaining unit 1205 in this embodiment have functions the same as those in the foregoing embodiment of this application, and details are not described again herein.

The receiving module 1301 is configured to enable the APP to receive a uniform resource locator of the preset service page sent by the server.

The first obtaining module 1302 is configured to enable the APP to obtain service information corresponding to the preset service page according to the uniform resource locator of the preset service page.

In some embodiments, the second terminal has an iBeacon-based positioning function, and is configured to send a beacon signal. The listening unit 1202 is further configured to enable the APP to invoke the first terminal to detect a beacon signal. The sending unit 1204 is configured to enable the APP to send a request command to a server according to the beacon signal, where the server searches for a preset service page corresponding to the beacon signal according to the request command.

In some embodiments, the second terminal has a WiFi-based positioning function, and is configured to send a WiFi signal. The listening unit 1202 is further configured to enable the APP to invoke the first terminal to detect a WiFi signal. The sending unit 1204 is configured to enable the APP to send a request command to a server according to the WiFi signal, where the server searches for a preset service page corresponding to the WiFi signal according to the request command.

In some embodiments, the obtaining unit 1205 is configured to enable an instant messaging APP to obtain the service information corresponding to the preset service page, where the service information corresponding to the preset service page is pushed by the WeChat platform.

In some embodiments, the detection unit 1201 is configured to enable the APP to invoke the first terminal, so that the first terminal detects the magnetic field strength in the preset distance range of the first terminal by using a magnetic sensor, where the magnetic sensor is used by the first terminal to sense the magnetic field strength and a magnetic field direction.

In this embodiment, the detection unit 1201 enables an APP to invoke a first terminal to detect a magnetic field strength in a preset distance range. The APP is installed in the first terminal, and is configured to receive service information of a near-field service. The magnetic field strength is generated by a second terminal. When it is detected that the magnetic field strength is greater than a preset magnetic field strength, the listening unit 1202 enables the APP to invoke the first terminal to listen to a near-field wireless communication signal broadcast by the second terminal. If the near-field wireless communication signal broadcast by the second terminal is detected, the processing unit 1203 processes the near-field wireless communication signal to obtain identification information of the second terminal. The sending unit 1204 enables the APP to send a request command to a server according to the identification information of the second terminal. The server searches for, according to the request command, a preset service page that corresponds to the identification information of the second terminal and that is applied in a preset service scenario. The identification information of the second terminal and the preset service page are pre-configured in the server. The obtaining unit 1205 enables the APP to obtain the preset service page corresponding to the identification information of the second terminal from the server, and output the preset service page in the first terminal, so that service information in a service scenario can be obtained automatically.

An embodiment of this application further provides a storage medium. In some embodiments, in this embodiment, the storage medium may be configured to store program code executed by a service processing method in the foregoing embodiment.

In some embodiments, in this embodiment, the storage medium may be located in at least one network devices among multiple network devices in a computer network.

In some embodiments, in this embodiment, the storage medium is configured to store program code used for executing the following steps: detecting a magnetic field strength in a preset distance range of a first terminal; when it is detected that the magnetic field strength is greater than a preset magnetic field strength, listening to a near-field wireless communication signal broadcast by a second terminal; if the near-field wireless communication signal broadcast by the second terminal is detected, processing the near-field wireless communication signal to obtain identification information of the second terminal; sending a request command to a server according to the identification information of the second terminal; and obtaining a preset service page corresponding to the identification information of the second terminal from the server, and outputting the preset service page in the first terminal.

In some embodiments, the storage medium is further configured to store program code used for executing the following steps: receiving a uniform resource locator of the preset service page sent by the server; and obtaining service information corresponding to the preset service page according to the uniform resource locator of the preset service page.

In some embodiments, the storage medium is further configured to store program code used for executing the following step: invoking the first terminal to detect a beacon signal, and send a request command to the server according to the beacon signal, where the server searches for a preset service page corresponding to the beacon signal according to the request command.

In some embodiments, the storage medium is further configured to store program code used for executing the following step: invoking the first terminal to detect a WiFi signal, and send a request command to the server according to the WiFi signal, where the server searches for a preset service page corresponding to the WiFi signal according to the request command.

In some embodiments, in this embodiment, the storage medium may include, but is not limited to: various media capable of storing program code, such as a USB flash memory, a ROM, a RAM, a mobile hard disk, a magnetic disk, or an optical disc.

An embodiment of this application further provides a computer terminal. The computer terminal may be any computer terminal device in a computer terminal group. In some embodiments, in this embodiment, the computer terminal may be replaced with a terminal device such as a mobile terminal.

In some embodiments, in this embodiment, the computer terminal may be located in at least one network device in multiple network devices in a computer network.

Figure 14:
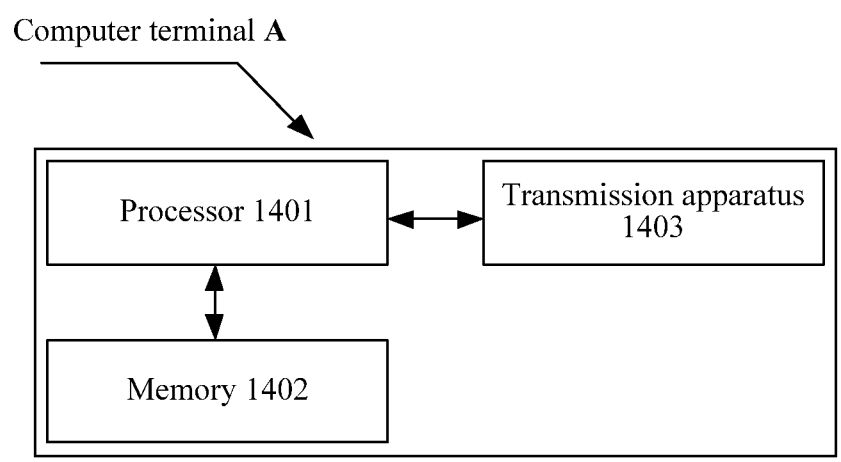
FIG. 14 is a structural block diagram of a computer terminal according to an embodiment of this application.

In some embodiments, FIG. 14 is a structural block diagram of a computer terminal according to an embodiment of the present disclosure. As shown in FIG. 14, the computer terminal A may include one or more (only one is shown in the figure) processors 1401, a memory 1402, and a transmission apparatus 1403.

The memory 1402 may be configured to store a software program and a module, such as a program instruction/module corresponding to the service processing method and apparatus in the embodiments of this application. The processor 1401 runs the software program and module stored in the memory 1402 to execute various functional applications and data processing, that is, implement the foregoing service processing method. The memory 1402 may include a high-speed RAM, and may further include a non-volatile memory, such as one or more magnetic storage apparatuses, a flash memory, or other non-volatile solid-state memories. In some examples, the memory 1402 may further include memories disposed remotely with respect to the processor 1401. The remote memories may be connected to the computer terminal A via a network. Examples of the network include, but are not limited to: the Internet, an intranet, a local area network, a mobile communications network, and a combination thereof.

The transmission apparatus 1403 is configured to receive or send data by using a network. Specific examples of the network may include a wired network and a wireless network. In an example, the transmission apparatus 1403 includes an NIC, which can be connected to another network device and a router via a network cable, and therefore can communicate with the Internet. In an example, the transmission apparatus 1403 may be an RF module, which is configured to communicate with the Internet in a wireless manner.

Specifically, the memory 1402 is configured to store information about a preset action condition and a preset privileged user, as well as an APP.

The processor 1401 may invoke, by using the transmission apparatus, the information and APP stored in the memory 1402, so as to perform the following steps: detecting a magnetic field strength in a preset distance range of a first terminal; when it is detected that the magnetic field strength is greater than a preset magnetic field strength, listening to a near-field wireless communication signal broadcast by a second terminal; if the near-field wireless communication signal broadcast by the second terminal is detected, processing the near-field wireless communication signal to obtain identification information of the second terminal; sending a request command to a server according to the identification information of the second terminal; and obtaining a preset service page corresponding to the identification information of the second terminal from the server, and outputting the preset service page in the first terminal.

In some embodiments, for specific examples in this embodiment, reference can be made to the examples described in the foregoing embodiments. Details are not described again in this embodiment.

The sequence numbers of the foregoing embodiments of this application are merely for the convenience of description, and do not imply the preference among the embodiments.

When the integrated units in the foregoing embodiment are implemented in the form of a software functional unit and sold or used as an independent product, the integrated units may be stored in a computer-readable storage medium. Based on such an understanding, the technical solutions of this application essentially, or the part contributing to the prior art, or a part or all of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application.

In the foregoing embodiments, the descriptions of the embodiments have respective focuses. For a part that is not described in detail in an embodiment, refer to related descriptions in other embodiments.

In the several embodiments provided in this application, it should be understood that the disclosed application may be implemented in other manners. For example, the described apparatus embodiments are merely examples. For example, the unit division is merely logical function division and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between units or modules may be implemented in electronic, mechanical, or other forms.

The units described as separate parts may or may not be physically separate, and the parts displayed as units may or may not be physical units. That is, the units may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in the form of hardware or in the form of a software functional unit.

The foregoing embodiments are merely several implementations of this application. It should be noted that, a person of ordinary skill in the art can make various improvements and modifications without departing from the principle of this application, and these improvements and modifications should also be regarded as the protection scope of this application.

What is claimed is:

1. A service processing method, comprising:
at a first computing device associated with a first user account of a social networking application, the first computing device having one or more processors and memory storing a plurality of programs to be executed by the one or more processors:
detecting a near-field wireless communication signal broadcasted by a second computing device associated with a service provider account registered with the social networking application, wherein the first computing device and the second computing device are communicatively connected to a server that supports the social networking application;

estimating a distance between the first computing device and the second computing device based on a signal strength value and a reference value of the near-field wireless communication signal;
in accordance with a determination that the distance between the first computing device and the second computing device is less than a preset threshold:
extracting, from the near-field wireless communication signal, identification information of the second computing device;
sending the identification information of the second computing device to the server;
obtaining a preset service page of the service provider account in the social networking application corresponding to the identification information of the second computing device from the server; and
displaying the preset service page in the social networking application on the first computing device.

2. The method according to claim 1, wherein before detecting the near-field wireless communication signal broadcast by the second computing device, the method further comprises:
enabling a near-field wireless communication function of the first computing device, the near-field wireless communication function comprising a Bluetooth communication function or a near field communication (NFC) function;
detecting whether the first computing device performs a movement operation along a direction approaching the second computing device; and
in accordance with a determination that the first computing device is moving towards the second computing device, triggering and performing the step of listening to a near-field wireless communication signal broadcasted by the second computing device.

3. The method according to claim 2, wherein the near-field wireless communication signal broadcasted by the second computing device is a Bluetooth Low Energy (BLE) signal, after extracting the identification information of the second computing device, the method further comprises:
determining, according to the BLE signal, whether the second computing device meets a service condition; and
if the second computing device meets the service condition, obtaining the preset service page corresponding to the identification information of the second computing device from the server.

4. The method according to claim 1, wherein before detecting the near-field wireless communication signal broadcast by the second computing device, the method further comprises:
detecting a magnetic field strength in a preset distance range of the first computing device; and
when the magnetic field strength is greater than a preset magnetic field strength, initiating the detection of the near-field wireless communication signal broadcasted by the second computing device.

5. The method according to claim 4, wherein the detecting the magnetic field strength in a preset distance range of the first computing device comprises:
detecting the magnetic field strength in the preset distance range of the first computing device using a magnetic sensor in the first computing device to sense a magnetic field strength and a magnetic field direction.

6. The method according to claim 1, wherein the obtaining the preset service page corresponding to the identification information associated with the second computing device from the server comprises:
- receiving a uniform resource locator of the preset service page sent by the server; and
- obtaining service information corresponding to the preset service page according to the uniform resource locator of the preset service page.

7. The method according to claim 1, wherein the detecting a near-field wireless communication signal broadcasted by a second computing device further comprises:
- detecting a beacon signal that is sent by the second computing device on the basis of an iBeacon positioning function; and
- the sending the identification information of the second computing device to the server comprises:
  - sending a request command including the identification information of the second computing device retrieved from the beacon signal to the server, to request the preset service page associated with the identification information of the second computing device obtained from the beacon signal.

8. The method according to claim 1, wherein the detecting a near-field wireless communication signal broadcasted by a second computing device further comprises:
- detecting a WiFi signal that is sent by the second computing device on the basis of a WiFi positioning function; and
- the sending the identification information of the second computing device to the server comprises:
  - sending the request command including the identification information of the second computing device retrieved from the WiFi signal to the server, to request the preset service page associated with the identification information of the second computing device obtained from the WiFi signal.

9. A first computing device associated with a first user account of a social networking application, the first computing device having one or more processors, and memory storing a plurality of programs that, when executed by the one or more processors, cause the first computing device to perform a plurality of operations including:
- detecting a near-field wireless communication signal broadcasted by a second computing device associated with a service provider account registered with the social networking application, wherein the first computing device and the second computing device are communicatively connected to a server that supports the social networking application;
- estimating a distance between the first computing device and the second computing device based on a signal strength value and a reference value of the near-field wireless communication signal;
- in accordance with a determination that the distance between the first computing device and the second computing device is less than a preset threshold:
- extracting, from the near-field wireless communication signal, identification information of the second computing device;
- sending the identification information of the second computing device to the server;
- obtaining a preset service page of the service provider account in the social networking application corresponding to the identification information of the second computing device from the server; and
- displaying the preset service page in the social networking application on the first computing device.

10. The first computing device according to claim 9, wherein the plurality of operations further comprise:
- before detecting the near-field wireless communication signal broadcast by the second computing device:
  - enabling a near-field wireless communication function of the first computing device, the near-field wireless communication function comprising a Bluetooth communication function or a near field communication (NFC) function;
  - detecting whether the first computing device performs a movement operation along a direction approaching the second computing device; and
  - in accordance with a determination that the first computing device is moving towards the second computing device, triggering and performing the step of listening to a near-field wireless communication signal broadcasted by the second computing device.

11. The first computing device according to claim 10, wherein the near-field wireless communication signal broadcasted by the second computing device is a Bluetooth Low Energy (BLE) signal, and the plurality of operations further comprise:
- after extracting the identification information of the second computing device:
  - determining, according to the BLE signal, whether the second computing device meets a service condition; and
  - if the second computing device meets the service condition, obtaining the preset service page corresponding to the identification information of the second computing device from the server.

12. The first computing device according to claim 9, wherein the plurality of operations further comprise:
- before detecting the near-field wireless communication signal broadcast by the second computing device:
  - detecting a magnetic field strength in a preset distance range of the first computing device; and
  - when the magnetic field strength is greater than a preset magnetic field strength, initiating the detection of the near-field wireless communication signal broadcasted by the second computing device.

13. The first computing device according to claim 9, wherein the obtaining the preset service page corresponding to the identification information associated with the second computing device from the server comprises:
- receiving a uniform resource locator of the preset service page sent by the server; and
- obtaining service information corresponding to the preset service page according to the uniform resource locator of the preset service page.

14. The first computing device according to claim 9, wherein the detecting a near-field wireless communication signal broadcasted by a second computing device further comprises:
- detecting a beacon signal that is sent by the second computing device on the basis of an iBeacon positioning function; and
- the sending the identification information of the second computing device to the server comprises:
  - sending a request command including the identification information of the second computing device retrieved from the beacon signal to the server, to request the preset service page associated with the identification information of the second computing device obtained from the beacon signal.

15. The first computing device according to claim 9, wherein the detecting a near-field wireless communication signal broadcasted by a second computing device further comprises:
- detecting a WiFi signal that is sent by the second computing device on the basis of a WiFi positioning function; and
- the sending the identification information of the second computing device to the server comprises:
  - sending the request command including the identification information of the second computing device retrieved from the WiFi signal to the server, to request the preset service page associated with the identification information of the second computing device obtained from the WiFi signal.

16. A non-transitory computer readable storage medium storing a plurality of programs in connection with a first computing device associated with a first user account of a social networking application, the first computing device having one or more processors, wherein the plurality of programs, when executed by the one or more processors, cause the first computing device to perform a plurality of operations including:
- detecting a near-field wireless communication signal broadcasted by a second computing device associated with a service provider account registered with the social networking application, wherein the first computing device and the second computing device are communicatively connected to a server that supports the social networking application;
- estimating a distance between the first computing device and the second computing device based on a signal strength value and a reference value of the near-field wireless communication signal;
- in accordance with a determination that the distance between the first computing device and the second computing device is less than a preset threshold:
  - extracting, from the near-field wireless communication signal, identification information of the second computing device;
- sending the identification information of the second computing device to the server;
- obtaining a preset service page of the service provider account in the social networking application corresponding to the identification information of the second computing device from the server; and
- displaying the preset service page in the social networking application on the first computing device.

17. The non-transitory computer readable storage medium according to claim 16, wherein the plurality of operations further comprise:
- before detecting the near-field wireless communication signal broadcast by the second computing device:
  - enabling a near-field wireless communication function of the first computing device, the near-field wireless communication function comprising a Bluetooth communication function or a near field communication (NFC) function;
  - detecting whether the first computing device performs a movement operation along a direction approaching the second computing device; and
  - in accordance with a determination that the first computing device is moving towards the second computing device, triggering and performing the step of listening to a near-field wireless communication signal broadcasted by the second computing device.

18. The non-transitory computer readable storage medium according to claim 16, wherein the plurality of operations further comprise:
- before detecting the near-field wireless communication signal broadcast by the second computing device:
  - detecting a magnetic field strength in a preset distance range of the first computing device; and
  - when the magnetic field strength is greater than a preset magnetic field strength, initiating the detection of the near-field wireless communication signal broadcasted by the second computing device.

19. The non-transitory computer readable storage medium according to claim 16, wherein the detecting a near-field wireless communication signal broadcasted by a second computing device further comprises:
- detecting a beacon signal that is sent by the second computing device on the basis of an iBeacon positioning function; and
- the sending the identification information of the second computing device to the server comprises:
  - sending a request command including the identification information of the second computing device retrieved from the beacon signal to the server, to request the preset service page associated with the identification information of the second computing device obtained from the beacon signal.

20. The non-transitory computer readable storage medium according to claim 16, wherein the detecting a near-field wireless communication signal broadcasted by a second computing device further comprises:
- detecting a WiFi signal that is sent by the second computing device on the basis of a WiFi positioning function; and
- the sending the identification information of the second computing device to the server comprises:
  - sending the request command including the identification information of the second computing device retrieved from the WiFi signal to the server, to request the preset service page associated with the identification information of the second computing device obtained from the WiFi signal.

* * * * *